3,661,921
Patented May 9, 1972

3,661,921
N-SUBSTITUTED AND N,N - DISUBSTITUTED
AMINOCARBONYLALKYL COMPOUNDS AND
THEIR PRODUCTION
Suminori Umio, Kawanishi-shi, Japan, assignor to
Fujisawa Pharmaceutical Co., Ltd., Osaka-shi, Japan
No Drawing. Continuation-in-part of application Ser. No.
733,828, June 3, 1968. This application Apr. 1, 1969,
Ser. No. 812,448
Claims priority, application Japan, June 5, 1967,
42/36,113; Sept. 30, 1967, 42/62,872
Int. Cl. C07d 91/16, 49/34
U.S. Cl. 260—304                    29 Claims

ABSTRACT OF THE DISCLOSURE

N-substituted and N,N - disubstituted aminocarbonylalkyl compounds of the formula:

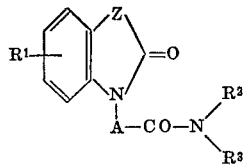

wherein Z is sulfur or lower alkylamino, A is lower alkylene, $R^1$ is hydrogen, halogen, lower alkyl, lower alkoxy or trifluoromethyl, $R^2$ is hydrogen, lower alkyl or hydroxy(lower)alkyl and $R^3$ is hydrogen, lower alkyl, halo(lower)alkyl, hydroxy(lower)alkyl, lower alkoxy(lower)alkyl, hydroxy(lower)alkoxy(lower)alkyl, hydroxycarbonyl(lower)alkyl, lower alkoxycarbonyl(lower)alkyl, phenyl bearing or not one or more of lower alkyl, halogen, hydroxyl, lower alkoxy and lower alkanoyl, phenyl(lower)alkyl having or not on the benzene ring one or more of lower alkyl, halogen, hydroxyl, lower alkoxy and lower alkanoyl, or the group of the formula:

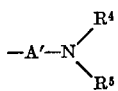

in which A' is lower alkylene and $R^4$ and $R^5$ are each lower alkyl or phenyl or, when taken together with the adjacent nitrogen atom, represent a 5 to 7-membered nitrogen containing heterocyclic group, or the group of the formula:

may represent a 3 to 7-membered heterocyclic group, provided that $R^1$ is not hydrogen when $R^2$ and $R^3$ are each lower alkyl or, in the linked form, represent a lower alkylene group or an oxa(lower)alkylene group and $R^1$ is not chlorine when both $R^2$ and $R^3$ are hydrogen. These compounds exhibit pharmacological activity such as antiinflammatory activity or antiarrhythmic activity.

This application is a continuation-in-part application of my copending application Ser. No. 733,828, filed June 3, 1968 (now abandoned).

The present invention relates to N-substituted and N,N-disubstituted aminocarbonylalkyl compounds having pharmacological activity such as antiinflammatory activity and antiarrhythmic activity, and their production.

The said N-substituted and N,N-disubstituted aminocarbonylalkyl compounds are representable by the formula:

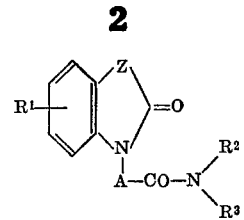

wherein Z is sulfur or lower alkylimino (e.g. methylimino, ethylimino, etc.), A is lower alkylene (e.g. methylene, ethylene, methylmethylene, trimethylene, propylene, etc.), $R^1$ is hydrogen, halogen (e.g. chlorine, bromine, iodine, etc.), lower alkyl (e.g. methyl, ethyl, propyl, isopropyl, butyl, etc.), lower alkoxy (e.g. methoxy, ethoxy, propoxy, isopropoxy, butoxy, etc.) or trifluoromethyl, $R^2$ is hydrogen, lower alkyl (e.g. methyl, ethyl, propyl, isopropyl, butyl, cyclohexyl, etc.) or hydroxy(lower)alkyl (e.g. hydroxymethyl, hydroxyethyl, etc.) and $R^3$ is hydrogen, lower alkyl (e.g. methyl, ethyl, propyl, isopropyl, butyl, cyclohexyl, etc.), halo(lower)alkyl (e.g. chloromethyl, chloroethyl, bromoethyl, etc.), hydroxy(lower)alkyl (e.g. hydroxymethyl, hydroxyethyl, 2-hydroxypropyl, etc.), lower alkanoyloxy(lower)alkyl (e.g. acetyloxymethyl, propanoyloxyethyl), lower alkoxy(lower)alkyl (e.g. methoxyethyl, ethoxyethyl, methoxypropyl, etc.), hydroxy(lower)alkoxy(lower)alkyl (e.g. hydroxymethoxyethyl, hydroxyethoxyethyl, etc.), hydroxycarbonyl(lower)alkyl (e.g. hydroxycarbonylmethyl, hydroxycarbonylethyl, etc.), lower alkoxycarbonyl(lower)alkyl (e.g. methoxycarbonylmethyl, ethoxycarbonylmethyl, ethoxycarbonylethyl, etc.), phenyl bearing or not one or more of lower alkyl (e.g. methyl, ethyl, propyl, isopropyl, butyl, etc.), halogen (e.g. chlorine, bromine, iodine, etc.), hydroxyl, lower alkoxy (e.g. methoxy, ethoxy, propoxy, isopropoxy, butoxy, etc.) and lower alkanoyl (e.g. acetyl, propionyl, butyryl, etc.), phenyl(lower)alkyl (e.g. benzyl, phenethyl, etc.) having or not on the benzene ring one or more of lower alkyl (e.g. methyl, ethyl, propyl, isopropyl, butyl, etc.), halogen (e.g. chlorine, bromine, iodine, etc.), hydroxyl, lower alkoxy (e.g. methoxy, ethoxy, propoxy, isopropoxy, butoxy, etc.) and lower alkanoyl (e.g. acetyl, propionyl, butyryl, etc.), or the group of the formula:

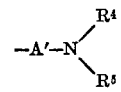

in which A' is lower alkylene (e.g. methylene, ethylene, methylmethylene, trimethylene, propylene, etc.) and $R^4$ and $R^5$ are each lower alkyl (e.g. methyl, ethyl, propyl, isopropyl, butyl, 2-methylpropyl, cyclohexyl, etc.) or phenyl or, when taken together with the adjacent nitrogen atom, represent a 5 to 7-membered heterocyclic group (e.g. 1-pyrrolidinyl, piperidino, 1-piperazinyl, 4-lower alkyl-1-piperazinyl, 4-phenyl(lower)alkyl-1-piperazinyl, 4-hydroxy(lower)alkyl-1-piperazinyl, 4-phenyl-1-piperazinyl, 4-(4-hydroxyphenyl)-1-piperazinyl, 4-(4-chlorophenyl)-1-piperazinyl, morpholino, 1-azepinyl, etc.), or the group of the formula:

may represent a 3 to 7-membered heterocyclic group (e.g. 1-aziridinyl, 1-diazepinyl, 1-pyrrolidinyl, piperidino, 4-hydroxypiperidino, 2-hydroxyethylpiperidino, 4-hydroxyethylpiperidino, 1-piperazinyl, 4-hydroxy(lower)alkyl-1-piperazinyl, 4-lower or higher alkanoyloxy(lower)alkyl-1-piperazinyl, 4-lower alkoxycarbonyl(lower)alkyl-1-piperazinyl, 4-lower alkanoyl(lower)alkyl-1-piperazinyl, 2,3,4, 5 or 6-mono, di or tri(lower)alkyl-1-piperazinyl such as 4-methyl-1-piperazinyl, 4-ethyl-1-piperazinyl, 3-methyl-1-piperazinyl, 2,5-dimethyl-1-piperazinyl, 3,4-dimethyl-1- piperazinyl, 2,4,6-trimethyl-1-piperazinyl or 2,4,5-trimethyl-1-piperazinyl, 2,3,5 or 6-mono or di(lower)alkyl-4-lower alkynyl-1-piperazinyl such as 2,5-dimethyl-4-(2-propinyl)-1-piperazinyl, 2,3,5 or 6-mono or di(lower)alkyl-4-lower alkenyl-1-piperazinyl such as 2,5-dimethyl-4-allyl-1-piperazinyl, 2,3,5 or 6-mono or di(lower)alkyl-4-hydroxy(lower)alkyl-1-piperazinyl such as 2,6-dimethyl-4-(2-hydroxyethyl)-1-piperazinyl, 2,5 - dimethyl-4-(3-hydroxypropyl)-1-piperazinyl or 2,5-diethyl-4-(3-hydroxypropyl)-1-piperazinyl, 4-phenylalkyl-1-piperazinyl having or not on the benzene ring one or more of lower alkyl, halogen, hydroxyl, lower alkoxy and lower alkanoyl such as 4-benzyl-1-piperazinyl, 4-(4'-chlorobenzyl)-1-piperazinyl or 4-(4'-methylbenzyl)-1-piperazinyl, 2,3,5 or 6-mono or di(lower)alkyl-4-phenyl(lower)alkyl-1-piperazinyl having or not on the benzene ring one or more of lower alkyl, halogen, hydroxyl, lower alkoxy and lower alkanoyl such as 2-methyl-4-benzyl-1-piperazinyl or 2,5-dimethyl-4-benzyl-1-piperazinyl, 4 - phenyl-1-piperazinyl having or not on the benzene ring one or more of lower alkyl, halogen, hydroxyl, lower alkoxy and lower alkanoyl such as 4-phenyl-1-piperazinyl, 4-(4-methylphenyl)-1-piperazinyl, 4-(4-chlorophenyl)-1-piperazinyl, 4-(2-chlorophenyl)-1-piperazinyl or 4-(2-bromophenyl)-1-piperazinyl, 1,2,5 or 6-mono or di(lower)alkyl-4-phenyl-1-piperazinyl having or not on the benzene ring one or more of lower alkyl, halogen, hydroxyl, lower alkoxy and lower alkanoyl such as 2-methyl-4-phenyl-1-piperazinyl, 2,5-dimethyl-4-phenyl-1-piperazinyl, 2,5,4' - trimethyl-4-phenyl-1-piperazinyl, morpholino, 1-azepinyl, etc.), provided that $R^1$ is not hydrogen when $R^2$ and $R^3$ are each lower alkyl or, in the linked form, represent a lower alkylene group or an oxa(lower)alkylene group and $R^1$ is not chlorine when both $R^2$ and $R^3$ are hydrogen.

The compounds [I] particularly and specifically include:

2-oxo-3-benzothiazoline(lower)alkanoic amide,
4,5,6 or 7-lower alkyl-2-oxo-3-benzothiazoline(lower)alkanoic amide,
4,5,6 or 7-lower alkoxy-2-oxo-3-benzothiazoline(lower)alkanoic amide,
4,5,6 or 7-trifluoromethyl-2-oxo-3-benzothiazoline(lower)alkanoic amide,
3-lower alkyl-4,5,6 or 7-trifluoromethyl-2-oxo-1-benzimidazoline(lower)alkanoic amide,
N-lower alkyl-2-oxo-3-benzothiazoline(lower)alkanoic amide,
N-lower alkyl-4,5,6 or 7-lower alkyl-2-oxo-3-benzothiazoline(lower)alkanoic amide,
N-lower alkyl-4,5,6 or 7-halo-2-oxo-3-benzothiazoline(lower)alkanoic amide,
N-lower alkyl-4,5,6 or 7-trifluoromethyl-2-oxo-3-benzothiazoline(lower)alkanoic amide,
N-lower alkyl-3-lower alkyl-4,5,6 or 7-trifluoromethyl-2-oxo-1-benzimidazoline(lower)alkanoic amide,
N-hydroxy(lower)alkyl-4,5,6 or 7-halo-2-oxo-3-benzothiazoline(lower)alkanoic amide,
N-hydroxy(lower)alkyl-4,5,6 or 7-trifluoromethyl-2-oxo-3-benzothiazoline(lower)alkanoic amide,
N-hydroxy(lower)alkyl-3-lower alkyl-4,5,6 or 7-trifluoromethyl-2-oxo-1-benzimidazoline(lower)alkanoic amide,
N,N-di(lower)alkyl-4,5,6 or 7-halo-2-oxo-3-benzothiazoline(lower)alkanoic amide,
N,N-di(lower)alkyl-4,5,6 or 7-trifluoromethyl-2-oxo-3-benzothiazoline(lower)alkanoic amide,
N-lower alkyl-N-hydroxy(lower)alkyl-4,5,6 or 7-trifluoromethyl-2-oxo-3-benzothiazoline(lower)alkanoic amide,
N-lower alkyl-N-hydroxy(lower)alkyl-4,5,6 or 7-halo-2-oxo-3-benzothiazoline(lower)alkanoic amide,
N-halo(lower)alkyl-4,5,6 or 7-halo-2-oxo-3-benzothiazoline(lower)alkanoic amide,
N-halo(lower)alkyl-4,5,6 or 7-trifluoromethyl-2-oxo-3-benzothiazoline(lower)alkanoic amide,
N-lower alkyl-N-halo(lower)alkyl-3-lower alkyl-4,5,6 or 7-trifluoromethyl-2-oxo-1-benzimidazoline(lower)alkanoic amide,
N-hydroxy(lower)alkyl-N-halo(lower)alkyl-3-lower alkyl-4,5,6 or 7-trifluoromethyl-2-oxo-1-benzimidazoline(lower)alkanoic amide,
N,N-dihydroxy(lower)alkyl-4,5,6 or 7-trifluoromethyl-2-oxo-3-benzothiazoline(lower)alkanoic amide,
N-lower alkoxy(lower)alkyl-2-oxo-3-benzothiazoline(lower)alkanoic amide,
N-lower alkoxy(lower)alkyl-4,5,6 or 7-halo-2-oxo-3-benzothiazoline(lower)alkanoic amide,
N-lower alkoxy(lower)alkyl-4,5,6 or 7-lower alkyl-2-oxo-3-benzothiazoline(lower)alkanoic amide,
N-lower alkyl-N-lower alkoxy(lower)alkyl-2-oxo-3-benzothiazoline(lower)alkanoic amide,
N-hydroxy(lower)alkyl-N-lower alkoxy(lower)alkyl-2-oxo-3-benzothiazoline(lower)alkanoic amide,
N-hydroxy(lower)alkoxy-2-oxo-3-benzothiazoline(lower)alkanoic amide,
N-hydroxy(lower)alkoxy(lower)alkyl-4,5,6 or 7-halo-2-oxo-3-benzothiazoline(lower)alkanoic amide,
N-hydroxy(lower)alkoxy(lower)alkyl-3-lower alkyl-4,5,6 or 7-halo-2-oxo-1-benzimidazoline(lower)alkanoic amide,
N-lower alkyl-N-hydroxy(lower)alkoxy(lower)alkyl-2-oxo-3-benzothiazoline(lower)alkanoic amide,
N-hydroxy(lower)alkyl-N-hydroxy(lower)alkoxy(lower)alkyl-2-oxo-3-benzothiazoline(lower)alkanoic amide,
2-oxobenzothiazolin-3-yl(lower)alkanoylamino acid,
4,5,6 or 7-halo-2-oxobenzothiazolin-3-yl(lower)alkanoylamino acid,
4,5,6 or 7-halo-2-oxobenzothiazolin-3-yl(lower)alkanoylamino acid lower alkyl ester,
N-lower alkyl-4,5,6 or 7-halo-2-oxobenzothiazoline-3-yl(lower)alkanoylamino acid,
N-lower alkyl-4,5,6 or 7-halo-2-oxobenzothiazolin-3-yl(lower)alkanoylamino acid lower alkyl ester,
2-oxo-3-benzothiazoline(lower)alkanoic anilide,
4,5,6 or 7-halo-2-oxo-3-benzothiazoline(lower)alkanoic anilide,
2',3',4',5' or 6'-lower alkyl-4,5,6 or 7-lower alkoxy-2-oxo-3-benzothiazoline(lower)alkanoic anilide,
3-lower alkyl-4,5,6 or 7-lower alkyl-2-oxo-1-benzimidazoline(lower)alkanoic anilide,
N-lower alkyl-N-phenyl-2-oxo-3-benzothiazoline(lower)alkanoic amide,
N-lower alkyl-N-phenyl-4,5,6 or 7-halo-2-oxo-3-benzothiazoline(lower)alkanoic amide,
N-lower alkyl-N-2,3,4,5 or 6-lower alkylphenyl)-4,5,6 or 7-trifluoromethyl-2-oxo-3-benzothiazoline(lower)alkanoic amide,
N-hydroxy(lower)alkyl-N-phenyl-2-oxo-3-benzothiazoline(lower)alkanoic amide,
N-hydroxy(lower)alkyl-N-phenyl-4,5,6 or 7-halo-2-oxo-3-benzothiazoline(lower)alkanoic amide,
N-hydroxy(lower)alkyl-N-phenyl-3-lower alkyl-4,5,6 or 7-lower alkyl-2-oxo-1-benzimidazoline(lower)alkanoic amide,
2',3',4',5' or 6'-hydroxy-4,5,6 or 7-halo-2-oxo-3-benzothiazoline(lower)alkanoic anilide,
2',3',4',5' or 6'-halo-2-oxo-3-benzothiazoline(lower)alkanoic anilide,
2',3',4',5' or 6'-halo-4,5,6 or 7-halo-2-oxo-3-benzothiazoline(lower)alkanoic anilide,
2',3',4',5' or 6'-lower alkoxy-2-oxo-3-benzothiazoline(lower)alkonic anilide,
2',3',4',5' or 6'-lower alkoxy-4,5,6 or 7-halo-2-oxo-3-benzothiazoline(lower)alkanoic anilide,
2',3',4',5' or 6'-lower alkylcarbonyl-2-oxo-3-benzothiazoline(lower)alkanoic anilide,
2',3',4',5' or 6'-lower alkylcarbonyl-4,5,6 or 7-halo-2-oxo-3-benzothiazoline(lower)alkanoic anilide,
N-lower alkyl-N-(2,3,4,5 or 6-hydroxyphenyl)-2-oxo-3-benzothiazoline(lower)alkanoic amide,
N-lower alkyl-N-(2,3,4,5 or 6-halophenyl)-4,5,6 or 7-trifluoromethyl-2-oxo-3-benzothiazoline(lower)alkanoic amide, N-lower alkyl-N-(2,3,4,5 or 6-lower alkoxyphenyl)-4,5,6 or 7-lower alkyl-2-oxo-3-benzothiazoline(lower) alkanoic amide,
N-lower alkyl-N-(2,3,4,5 or 6-lower alkylcarbonylphenyl) 4,5,6 or 7-lower alkoxy-2-oxo-3-benzothiazoline(lower) alkanoic amide,
N-lower alkyl-N-(2,3,4,5 or 6-lower alkylcarbonylphenyl)-3-lower alkyl-4,5,6 or 7-lower alkoxy-2-oxo-1-benzimidazoline(lower)alkanoic amide,
N-hydroxy(lower)alkyl-N-(2,3,4,5 or 6-hydroxyphenyl)-2-oxo-3-benzothiazoline(lower)alkanoic amide,
N-hydroxy(lower)alkyl-N-(2,3,4,5 or 6-halophenyl)-4,5,6 or 7-lower alkyl--2-oxo-3-benzothiazoline(lower) alkanoic amide,
N-hydroxy(lower)alkyl-N-(2,3,4,5 or 6-lower alkoxyphenyl)-4,5,6 or 7-halo-2-oxo-3-benzothiazoline(lower) alkanoic amide,
N-hydroxy(lower)alkyl-N-(2,3,4,5 or 6-lower alkylcarbonylphenyl)-4,5,6 or 7-halo-2-oxo-3-benzothiazoline (lower)alkanoic amide,
2',3',4',5' or 6'-dihalo-2-oxo-3-benzothiazoline(lower) alkanoic anilide,
2,3,4,5 or 6-di(lower)alkyl-2-oxo-3-benzothiazoline(lower)alkanoic anilide,
N-lower alkyl-N-(2,3,4,5 or 6-halo and hydroxyphenyl)-2-oxo-3-benzothiazoline(lower)alkanoic amide,
N-hydroxy(lower)alkyl-N-(2,3,4,5 or 6-dihalophenyl)-4,5,6 or 7-lower alkyl-2-oxo-3-benzothiazoline(lower) alkanoic amide,
1,2',3',4',5',6',4,5,6 or 7-trihalo-2-oxo-3-benzothiazoline (lower)alkanoic anilide,
N-lower alkylphenyl-4,5,6 or 7-trifluoromethyl-2-oxo-3-benzothiazoline(lower)alkanoic amide,
N-[2,3,4,5 or 6-hydroxyphenyl(lower)alkyl]-4,5,6 or 7-halo-2-oxo-3-benzothiazoline(lower)alkanoic amide,
N-[2,3,4,5 or 6-halophenyl(lower)alkyl]-4,5,6 or 7-trifluoromethyl-2-oxo-3-benzothiazoline(lower)alkanoic amide,
N-[2,3,4,5 or 6-loweralkoxyphenyl(lower)alkyl]-4,5,6 or 7-halo-2-oxo-3-benzothiazoline(lower)alkanoic amide,
N-[2,3,4,5 or 6-loweralkylcarbonylphenyl(lower)alkyl]-2-oxo-3-benzothiazoline(lower)alkanoic amide,
N-[2,3,4,5 or 6-dihalophenyl(lower)alkyl]-2-oxo-3-benzothiazoline(lower)alkanoic amide,
N-lower alkyl-N-phenyl(lower)alkyl-2-oxo-3-benzothiazoline(lower)alkanoic amide,
N-hydroxy(lower)alkyl-N-[2,3,4,5 or 6-halophenyl (lower)alkyl]-2-oxo-3-benzothiazoline(lower)alkanoic amide,
N-[N,N-di(lower)alkylamino(lower)alkyl]-2-oxo-3-benzothiazoline(lower)alkanoic amide,
N-[N,N-di(lower)alkylamino(lower)alkyl]-4,5,6 or 7-halo-2-oxo-3-benzothiazoline(lower)alkanoic amide,
N-[N,N-di(lower)alkylamino(lower)alkyl]-4,5,6 or 7-trifluoromethyl-2-oxo-3-benzothiazoline(lower) alkanoic amide,
N-[N-lower alkyl-N-phenylamino(lower)alkyl]-2-oxo-3-benzothiazoline(lower)alkanoic amide,
N-[N,N-diphenylamino(lower)alkyl]-2-oxo-3-benzothiazoline(lower)alkanoic amide,
N-lower alkyl-N-[N,N-di(lower)alkylamino(lower) alkyl]-2-oxo-3-benzothiazoline(lower)alkanoic amide,
N-lower alkyl-N-[N-lower alkyl-N-phenylamino(lower) alkyl]-4,5,6 or 7-halo-2-oxo-3-benzothiazoline(lower) alkanoic amide,
N-hydroxy(lower)alkyl-N-[N,N-di(lower)alkylamino (lower)alkyl]-2-oxo-3-benzothiazoline(lower)alkanoic amide,
N-hydroxy(lower)alkyl-N-[N-lower alkyl-N-phenylamino (lower)alkyl]-4,5,6 or 7-halo-2-oxo-3-benzothiazoline (lower)alkanoic amide,
N-[1-pyrrolidinyl(lower)alkyl]-2-oxo-3-benzothiazoline (lower)alkanoic amide,
N-piperidino(lower)alkyl-2-oxo-3-benzothiazoline (lower)alkanoic amide,
N-lower alkyl-N-piperidino(lower)alkyl-2-oxo-3-benzothiazoline(lower)alkanoic amide,
N-[2,3,4,5 or 6-hydroxy(lower)alkylpiperidino(lower) alkyl]-2-oxo-3-benzothiazoline(lower)alkanoic amide,
N-[1-piperazinyl(lower)alkyl]-2-oxo-3-benzothiazoline (lower)alkanoic amide,
N-[2,3,4,5 or 6-mono, di or tri(lower)alkyl-1-piperazinyl (lower)alkyl]-2-oxo-3-benzothiazoline(lower)alkanoic amide,
N-[4-hydroxy(lower)alkyl-1-piperazinyl(lower)alkyl]-2-oxo-3-benzothiazoline(lower)alkanoic amide,
N-[4-phenyl(lower)alkyl-1-piperazinyl(lower)alkyl]-2-oxo-3-benzothiazoline(lower)alkanoic amide,
N-morpholino(lower)alkyl-2-oxo-3-benzothiazoline (lower)alkanoic amide,
N-[1-azepinyl(lower)alkyl]-2-oxo-3-benzothiazoline (lower)alkanoic amide,
N-lower alkyl-N-[2,3,4,5 or 6-hydroxy(lower)alkylpiperidino(lower)alkyl]-2-oxo-3-benzothiazoline(lower) alkanoic amide,
N-lower alkyl-N-[2,3,4,5 or 6-hydroxy(lower)alkylpiperidino(lower)alkyl]-3-lower alkyl-2-oxo-1-benzimidazoline(lower)alkanoic amide,
N-hydroxy(lower)alkyl-N-morpholino(lower)alkyl-3-lower alkyl-2-oxo-1-benzimidazoline(lower)alkanoic amide,
N-hydroxy(lower)alkyl-N-morpholino(lower)alkyl-2-oxo-3-benzothiazoline(lower)alkanoic amide,
3-[1-aziridinylcarbonyl(lower)alkyl]-2(3H)benzothiazolinone,
3-[1-aziridinylcarbonyl(lower)alkyl]-4,5,6 or 7-halo-2(3H)-benzothiazolinone,
3-[1-aziridinylcarbonyl(lower)alkyl]-4,5,6 or 7-lower alkyl-2(3H)-benzothiazolinone,
3-[1-pyrrolidinylcarbonyl(lower)alkyl]-2(3H)-benzothiazolinone,
1-[1-pyrrolidinylcarbonyl(lower)alkyl]-3-lower alkyl-2(1H)-benzothiazolinone,
3-[1-pyrrolidinylcarbonyl(lower)alkyl]-4,5,6 or 7-halo-2(3H)-benzothiazolinone,
3-[1-pyrrolidinylcarbonyl(lower)alkyl]-4,5,6 or 7-trifluoromethyl-2(3H)-benzothiazolinone,
3-piperidinocarbonyl(lower)alkyl-2(3H)-benzothiazolinone,
3-[2,3,4,5 or 6-hydroxy(lower)alkylpiperidinocarbonyl (lower)alkyl]-4,5,6 or 7-halo-2(3H)-benzothiazolinone,
3-[2,3,4,5 or 6-hydroxy(lower)alkylpiperidinocarbonyl (lower)alkyl]-4,5,6 or 7-lower alkyl-2(3H)-benzothiazolinone,
3-[1-piperazinylcarbonyl(lower)alkyl]-2(3H)-benzothiazolinone,
3-[1-piperazinylcarbonyl(lower)alkyl]-4,5,6 or 7-halo-2(3H)-benzothiazolinone,
3-[1-piperazinylcarbonyl(lower)alkyl]-4,5,6 or 7-trifluoromethyl-2(3H)-benzothiazolinone,
3-[4-lower alkyl-1-piperazinylcabonyl(lower)alkyl]-4,5,6 or 7-trifluoromethyl-2(3H)-benzothiazolinone,
3-[4-lower alkyl-1-piperazinylcarbonyl(lower)alkyl]-2(3H)-benzothiazolinone,
3-[2,3,4,5 or 6-di(lower)alkyl-1-piperazinylcarbonyl (lower)alkyl]-4,5,6 or 7-halo-2(3H)-benzothiazolinone,
3-[2,3,4,5 or 6-di(lower)alkyl-1-piperazinylcarbonyl (lower)alkyl]4,5,6 or 7-lower alkoxy-2(3H)-benzothiazolinone,
1-[2,3,4,5 or 6-di(lower)alkyl-1-piperazinylcarbonyl (lower)alkyl]-3,4,5,6 or 7-mono or di(lower)alkyl-2(1H)-benzimidazolinone,
3-[4-hydroxy(lower)alkyl-1-piperazinylcarbonyl(lower) alkyl]-2(3H)-benzothiazolinone,
3-[4-hydroxy(lower)alkyl-1-piperazinylcarbonyl(lower) alkyl]4,5,6 or 7-halo-2(3H)-benzothiazolinone,
3-[4-hydroxy(lower)alkyl-1-piperazinylcarbonyl(lower) alkyl]-4,5,6 or 7-(lower)alkyl-2(3H)-benzothiazolinone, 3-[4-phenyl-1-piperazinylcarbonyl(lower)alkyl]-2(3H)-benzothiazolinone,
3-[4-phenyl-1-piperazinylcarbonyl(lower)alkyl]-4,5,6 or 7-halo-2(3H)-benzothiazolinone,
3-[4-phenyl(lower)alkyl-1-piperazinylcarbonyl(lower)alkyl]-4,5,6 or 7-halo-2(3H)-benzothiazolinone,
3-[4-phenyl(lower)alkyl-1-piperazinylcarbonyl(lower)alkyl]-2(3H)-benzothiazolinone,
3-[4-phenyl(lower)alkyl-1-piperazinylcarbonyl(lower)alkyl]-4,5,6 or 7-trifluoromethyl-2(3H)-benzothiazolinone,
1-[4-phenyl(lower)alkyl-1-piperazinylcarbonyl(lower)alkyl]-3-lower alkyl-4,5,6 or 7-trifluoromethyl-2-(1H)-benzothiazolinone,
3-[2,3,5 or 6-mono or di(lower)alkyl-4-hydroxy(lower)alkyl-1-piperazinylcarbonyl(lower)alkyl]-2(3H)-benzothiazolinone,
3-[2,3,5 or 6-mono or di(lower)alkyl-4-hydroxy(lower)alkyl-1-piperazinylcarbonyl(lower)alkyl]-4,5,6 or 7-halo-2(3H)-benzothiazolinone,
3-[2,3,5 or 6-mono or di(lower)alkyl-4-hydroxy(lower)alkyl-1-piperazinylcarbonyl(lower)alkyl]-4,5,6 or 7-trifluoromethyl-2(3H)-benzothiazolinone,
3-morpholinocarbonyl(lower)alkyl-2(3H)-benzothiazolinone,
3-morpholinocarbonyl(lower)alkyl-4,5,6 or 7-halo-2(3H)-benzothiazolinone,
3-morpholinocarbonyl(lower)alkyl-4,5,6 or 7-trifluoromethyl-2(3H)-benzothiazolinone,
3-[1-azepinylcarbonyl(lower)alkyl]-2(3H)-benzothiazolinone,
1-[1-azepinyl carbonyl(lower)alkyl]-3-lower alkyl-4,5,6 or 7-halo-2(1H)-benzimidazolinone,
N-[2,3,4,5 or 6-lower alkylphenyl(lower)alkyl]-2-oxo-3-benzothiazoline(lower)alkanoic amide, etc.

The designation "lower" indicates up to 4 carbon atoms.

It has now been found that the compounds [I] commonly and characteristically show antiinflammatory and/or antiarrhythmic activity. Among them, the following compounds exhibit relatively high antiinflammatory potency:

3-[4-(2-hydroxyethyl)-1-piperazinylcarbonylmethyl]-5-chloro-2(3H)-benzothiazolinone,
N-(2-hydroxypropyl)-5-chloro-2-oxo-3-benzothiazolineacetamide,
N-(2-hydroxyethyl)-6-chloro-2-oxo-3-benzothiazolineacetamide,
N-[2-(2-hydroxyethoxy)ethyl]-5-chloro-2-oxo-3-benzothiazolineacetamide,
N-(2-hydroxypropyl)-7-chloro-2-oxo-3-benzothiazolineacetanilide,
N-(2-ethoxyethyl)-5-chloro-2-oxo-3-benzothiazolineacetamide,
N-methyl-5-trifluoromethyl-2-oxo-3-benzothiazolineacetamide, etc.

Further, the following compounds exhibit relatively strong antiarrhythmic potency:

N-[2-(N,N-diethylamino)ethyl]-2-oxo-3-benzothiazolineacetamide,
N-[2-(N,N-diethylamino)ethyl]-5-chloro-2-oxo-3-benzothiazolineacetamide,
N-[3-(N,N-dimethylamino)propyl]-2-oxo-3-benzothiazolineacetamide,
N-[2-(N,N-diethylamino)ethyl]-6-ethoxy-2-oxo-3-benzothiazolineacetamide, etc.

Accordingly, a basic object of the present invention is to embody the N-substiunted and N,N-disubstituted aminocarbonylalkyl compounds [I]. Another object of this invention is to embody the pharmacologically active compounds [I]. Another object of the invention is to embody the compounds [I] useful as antiinflammatory agents. A further object of the invention is to embody the compounds [I] useful as antiarrhythmic agents. A further object of the invention is to embody a process for preparing the compounds [I]. These and other objects will be apparent to those conversant with the art to which the present invention pertains from the subsequent description.

According to the present invention, the compound [I] can be prepared from the corresponding nitrogen containing heterocyclic compound of the formula:

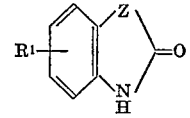

[II]

wherein Z and R¹ are each as defined above or the corresponding carboxylalkyl compound of the formula:

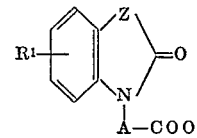

[III]

wherein Z, A and R¹ are each as defined above.

When the starting compound is the compound [II], it is subjected to N-substituted or N,N-disubstituted aminocarbonylalkylation. The N-substituted or N,N-disubstituted aminocarbonylalkylation may be carried out by reacting the compound [II] [J. Pharm. Soc., Japan, 77, 347 (1957)] or its reactive derivative with an alkyl halide of the formula:

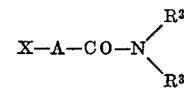

wherein X is halogen (e.g. chlorine, bromine, etc.) and A, R² and R³ are each as defined above. Examples of the reactive derivative of the compound [II] are metal salts (e.g. sodium salt, potassium salt, calcium salt, etc.). The reaction is usually effected in an inert solvent (e.g. benzene, toluene, ether, methanol, ethanol, dimethylformamide, etc.). In the case using the compound [II] as such, it is desirable to use a condensing agent, of which examples are alkali hydroxide (e.g. sodium hydroxide, potassium hydroxide, etc.), alkali carbonate (e.g. sodium carbonate, potassium carbonate, etc.), alkali alkoxide (e.g. sodium methoxide, sodium ethoxide, potassium ethoxide, etc.), alkali hydride (e.g. sodium hydride, potassium hydride, etc.), alkali amide (e.g. sodium amide, potassium amide, lithium amide, etc.) and the like.

When the starting compound is the compound [III], it is subjected to N-substituted or N,N-disubstituted amination. The N-substituted or N,N-disubstituted amination may be carried out by reacting the compound [III] [British Pat. 862,226], its salts or its reactive derivative with an amine of the formula:

wherein R² and R³ are each as defined above. Examples of the salt of the compound [III] are metal salts (e.g. sodium salt, potassium salt, calcium salt, etc.), ammonium salt, salts with organic base (e.g. triethylamine salt, etc.) and the like. Example of the reactive derivative of the compound [III] are acid halides (e.g. acid chloride, acid bromide, etc.), acid anhydrides (e.g. alkylphosphoric acid anhydride, dibenzylphosphoric acid anhydride, halophosphoric acid anhydride, dialkylphosphoric acid anhydride, sulfurous acid anhydride, thiosulfuric acid anhydride, sulfuric acid anhydride, alkylcarbonic acid anhydride, aliphatic carboxylic acid anhydride, aromatic carboxylic acid anhydride, symmetric acid anhydride, etc.), acid amides (e.g. acid amide with imidazole, acid amide with 4-substituted imidazole, etc.), acid esters (e.g. methyl ester, ethyl ester, cyanomethyl ester, p-nitrophenyl ester, pentachlorophenyl ester, 2,4,5-trichlorophenyl ester, propargyl ester, carboxymethyl thioester, pyranyl ester, methoxymethyl ester, phenyl thioester, etc.) and acid azide. In the case using the compound III as such, it is usually required to employ a condensing agent. Examples of the condensing agent are N,N'-dicyclohexylcarbodiimide,
N-cyclohexyl-N'-morpholinoethylcarbodiimide,
N-cyclohexyl-N'-(4-diethylaminocyclohexyl)carbodiimide,
N,N'-diethyl-carbodiimide,
N,N'-diisopropylcarbodiimide,
N-ethyl-N'-(3-dimethylaminopropyl)carbodiimide,
N,N'-carbonyldi(2-methylimidazole),
pentamethyleneketene-N-cyclohexylimine,
diphenylketene-N-cyclohexylimine,
alkoxyacetylene,
1-alkoxy-1-chloroethylene,
tetraalkyl phosphite,
N-ethyl-O-phenylisoxazolium-3'-sulfonate,
ethyl polyphosphate,
isopropyl polyphosphate,
phosphorus oxychloride,
phosphorus trichloride,
thionyl chloride,
oxalyl chloride,
triphenyl phosphine, etc.

The reaction is usually executed in an inert solvent (e.g. acetone, dioxane, acetonitrile, chloroform, ethylene dichloride, tetrahydrofuran, ethyl acetate, pyridine, etc.). If necessary, a basic substance (e.g. alkali carbonate, alkali hydrogen carbonate, trialkylamine, pyridine, etc.) may be present in the reaction.

Some of the compounds [I] may be alternatively produced from those prepared by either one of the said fundamental procedures (i.e. N-substituted or N,N-disubstituted aminocarbonylalkylation and N-substituted or N,N-disubstituted amination). An example of such alternative procedures is shown in the following scheme:

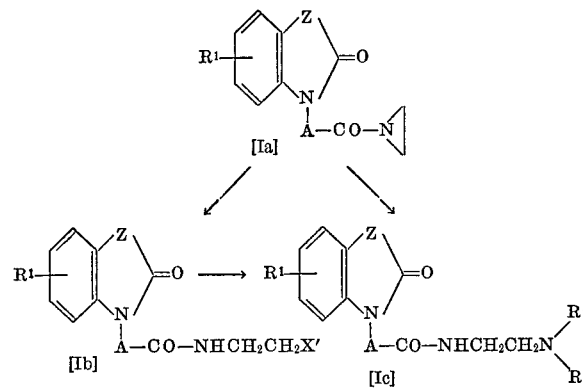

wherein X' is halogen (e.g. chlorine, bromine, etc.) and Z, A, R¹, R⁴ and R⁵ are each as defined above.

In the above scheme, the starting compound [Ia] is obtained by the reaction of the compound [III] with aziridine, which is an embodiment of the said N,N-disubstituted amination. The conversion of the compound [Ia] into the compound [Ib] may be executed by treatment of the former with a hydrohalogenic acid (e.g. hydrochloric acid, hydrobromic acid, hydroiodic acid, etc.). This conversion, however, sometimes takes place subsequent to the production of the compound [Ia] from the compound [III] when a hydrohalogenic acid is present. The compound [Ib] thus obtained can be reacted with an amine of the formula:

wherein R⁴ and R⁵ are each as defined above normally in the presence of a base (e.g. sodium hydroxide, potassium hydroxide, sodium carbonate, sodium ethoxide, etc.) to give the compound [Ic], which may be also prepared directly from the compound [Ia] by reacting the same with the said amine.

Another example of the alternative procedures is shown in the following scheme:

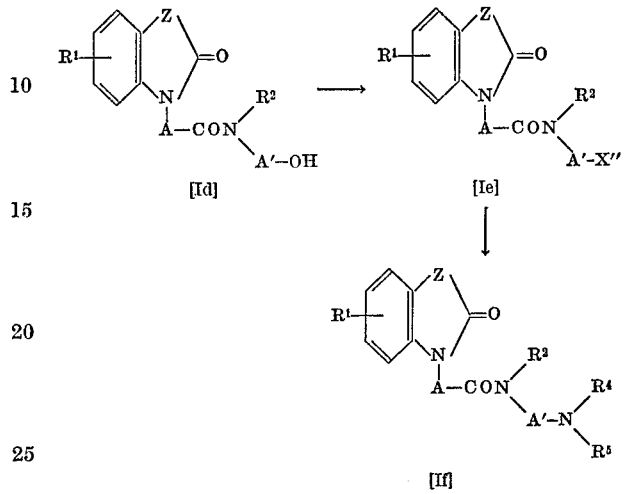

wherein X'' is halogen (e.g. chlorine, bromine, etc.) and Z, A, A', R¹, R², R⁴ and R⁵ are each as defined above.

In the above scheme, the starting compound [Id] is obtained by the reaction of the compound [III] with an amine of the formula:

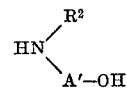

wherein A' and R² are each as defined above, which is an embodiment of the said N-substituted or N,N-disubstituted amination. The conversion of the compound [Id] into the compound [Ie] may be effected by halogenating the former with a halogenating agent in a per se conventional method. The subsequent conversion of the compound [Ie] into the compound [If] may be executed by reacting the former with an amine of the formula:

wherein R⁴ and R⁵ are each as defined above normally in the presence of a base (e.g. sodium hydroxide, potassium hydroxide, sodium carbonate, sodium ethoxide, etc.).

Another example of the alternative procedures is shown in the following scheme:

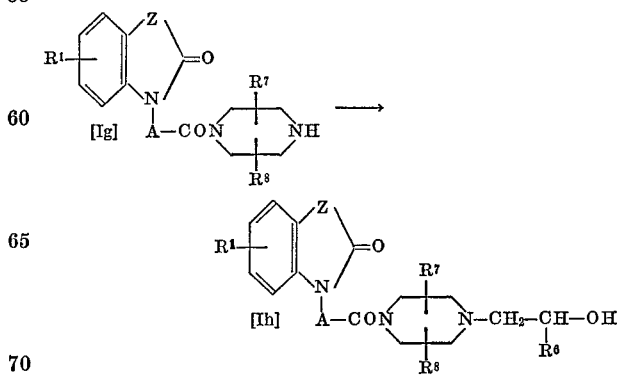

wherein R⁶ is hydrogen or lower alkyl (e.g. methyl, ethyl, propyl, etc.), R⁷ and R⁸ are each hydrogen or lower alkyl (e.g. methyl, ethyl, propyl, etc.) and Z, A and R¹ are each as defined above.

In the above scheme, the starting compound [Ig] is obtained by the reaction of the compound [III] with an amine of the formula:

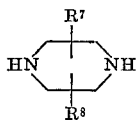

wherein $R^7$ and $R^8$ are each as defined above, which is an embodiment of the said N,N-disubstituted amination. The conversion of the compound [Ig] into the compound [Ih] may be effected by reacting the former with an alkylene oxide of the formula:

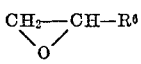

wherein $R^6$ is as defined above. The reaction can be effected in an inert solvent (e.g. methanol, ethanol, acetone, chloroform, dioxane, benzene, n-hexane, toluene, xylene, etc.). In place of the inert solvent, the alkylene oxide (e.g. ethylene oxide, propylene oxide, etc.) itself may be served as the reaction medium.

Another example of the alternative procedures is shown in the following scheme:

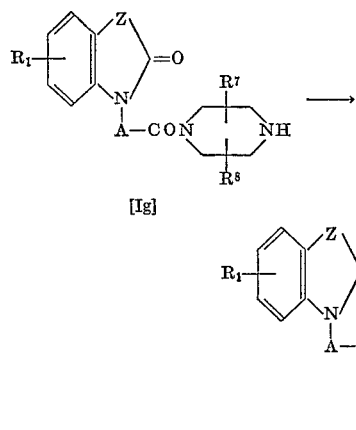

wherein $A''$ is lower alkylene (e.g. methylene, ethylene, methylmethylene, trimethylene, propylene, etc.) and Z, A, $R^1$, $R^7$ and $R^8$ are each as defined above. The above conversion of the compound [Ig] into the compound [Ii] may be carried out by reacting the former with a haloalkanol of the formula:

wherein $X'''$ is halogen (e.g. chlorine, bromine, iodine, etc.) and $A''$ is as defined above. The reaction can be effected in an inert solvent (e.g. methanol, ethanol, ether, benzene, acetone, dimethylformamide, dimethylsulfoxide, etc.), if needed, in the presence of a condensing agent such as alkali carbonate (e.g. sodium carbonate, potassium carbonate, etc.), alkaline earth carbonate (e.g. magnesium carbonate, calcium carbonate, barium carbonate, etc.) or alkali hydrogen carbonate (e.g. sodium hydrogen carbonate, potassium hydrogen carbonate, etc.). Instead of the inert solvent, the haloalkanol (e.g. 2-bromoethanol, 2-chloroethanol, 2 - iodoethanol, 3 - bromopropanol, 1-bromo - 2 - propanol, etc.) may be employed itself as the reaction medium.

Another example of the alternative procedures is shown in the following scheme:

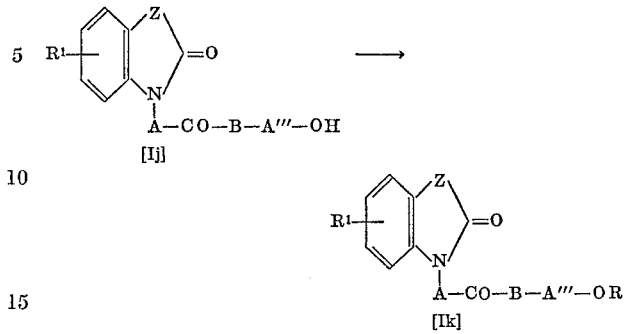

wherein B is

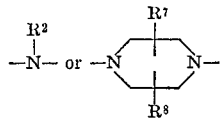

in which $R^2$, $R^7$ and $R^8$ are each as defined above, $A'''$ is lower alkylene (e.g. methylene, ethylene, methylmethylene, trimethylene, propylene), $R^9$ is lower alkanoyl (e.g. acetyl, propionyl, butyryl) and Z, A and $R^1$ are each as defined above.

In the above scheme, the starting compound [Ij] is obtained by the reaction of the compound [II] with an alkyl halide of the formula:

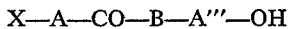

wherein X, B, A and $A'''$ are each as defined above which is an embodiment of the said N-substituted or N,N-disubstituted aminocarbonylalkylation or of the compound [III] with an amine of the formula:

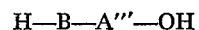

wherein B and $A'''$ are each as defined above which is an embodiment of the said N-substituted or N,N-disubstituted amination. The one fallen in the category of the said compound [Ih] or [Ii] may be also used as the starting compound in this procedure. The conversion of the compound [Ij] into the compound [Ik] may be effected by reacting the former with an acylating agent. Examples of the acylating agent are lower alkanoic anhydride (e.g. acetic anhydride, propionic anhydride, butyric anhydride) and lower alkanoyl halide (e.g. acetyl chloride, acetyl bromide, propionyl chloride, butyryl chloride). The reaction can be carried out in a per se conventional procedure adopted for acylation.

A further example of the alternative procedures is shown in the following scheme:

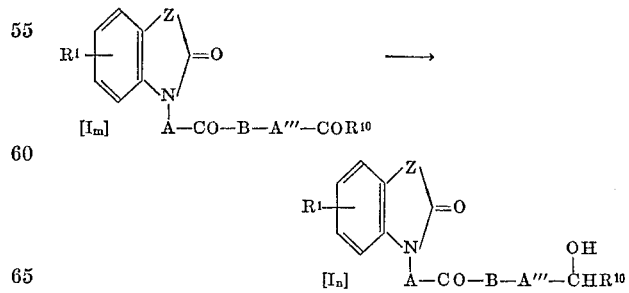

wherein $R^{10}$ is lower alkyl (e.g. methyl, ethyl, propyl, isopropyl) and Z, B, A, $A'''$ and $R^1$ are each as defined above.

In the above scheme, the starting compound [Im] is obtained by the reaction of the compound [II] with an alkyl halide of the formula:

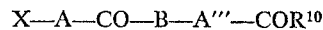

wherein X, B, A, $A'''$ and $R^{10}$ are each as defined above which is an embodiment of the said N-substituted or N,N-disubstituted aminocarbonylalkylation or of the compound [III] with an amine of the formula:

$$H—B—A'''—COR^{10}$$

wherein B, A''' and $R^{10}$ are each as defined above which is an embodiment of the said N-substituted or N,N-disubstituted amination. The conversion of the compound [Im] into the compound [In] may be effected by treating the former with a reducing agent, preferably alkali metal hydride complex (e.g. lithium aluminium hydride) in an inert solvent (i.e. ether, tetrahydrofuran, dioxane).

A still further example of the alternative procedures is shown in the following scheme:

[Chemical scheme showing compound [Io] with structure containing $R^1$, Z, =O, N, A—CO—B—A'''—COOR'' converting to compound [Ip] with A—CO—B—A'''—CH₂—OH]

wherein $R^{11}$ is lower alkyl (e.g. methyl, ethyl, propyl, isopropyl) and Z, B, A, A''' and $R^1$ are each as defined above.

In the above scheme, the starting compound [Io] is obtained by the reaction of the compound [II] with an alkyl halide of the formula:

$$X—A—CO—B—A'''—COOR^{11}$$

wherein X, B, A, A''' and $R^{11}$ are each as defined above which is an embodiment of the said N-substituted or N,N-disubstituted aminocarbonylalkylation or of the compound [III] with an amine of the formula:

$$H—B—A'''—COOR^{11}$$

wherein B, A''' and $R^{11}$ are each as defined above which is an embodiment of the said N-substituted or N,N-disubstituted amination. The conversion of the compound [Io] into the compound [Ip] may be executed by treating the former with a reducing agent, preferably alkali metal hydride complex (e.g. lithium aluminum hydride) in an inert solvent (e.g. ether, tetrahydrofuran, dioxane).

As stated above, the compounds [I] are useful as anti-inflammatory agents. Some of test results which ensure such utility are shown below.

(1) The inhibitory effect on swelling induced by Formalin, albumin or carrageenin (a) The effect of 3-[4-(2-hydroxyethyl)-1-piperazinylcarbonylmethyl]-5 - chloro - 2(3H) - benzothiazolinone.— Method: Wistar strain male rats each weighing 150 to 200 g. were divided into two groups. One group (10 rats) received orally 1 ml. of a suspension of the test drug in 1% carboxymethylcellulose solution per 100 g. of the body weight (the drug treated group); the other group (10 rats) received 1 ml. of 1% carboxymethylcellulose solution alone per 100 g. of the body weight in the similar fashion (control group). One hour after administration, formalin (2%, 0.1 ml.), egg white albumin (10%, 0.1 ml.) or carrageenin (1%, 0.1 ml.) was given to the animals into the hind paw to induce swelling. The paw's thickness was measured by a slide caliper at varying time intervals after injection of the swelling-inducing substance. The swelling percent and the inhibitory percent of swelling were calculated from the following equations:

$$\text{Swelling percent} = \frac{t-T}{T} \times 100 \text{ (percent)}$$

T: Paw's thickness before the swelling-inducing substance being given.
t: Paw's thickness at the varying time after the swelling inducing substance being given.

$$\text{Inhibitory percent} = \frac{C-D}{C} \times 100 \text{ (percent)}$$

C: Swelling percent in control group.
D: Swelling percent in the drug treated group. Several hours after injection of the swelling-inducing substance (3 hours in Formalin or albumin injection; 4 hours in carrageenin injection), the animals were killed. Both hind paws were cut off and weighed. The swelling percent and the inhibitory percent of swelling were calculated from the following equations:

$$\text{Swelling percent} = \frac{w-W}{W} \times 100 \text{ (percent)}$$

W: Weight of the swelling-inducing substance uninjected paw.
w: Weight of the swelling-inducing substance injected paw.

$$\text{Inhibitory percent} = \frac{E-F}{E} \times 100 \text{ (percent)}$$

E: Swelling percent in control group.
F: Swelling percent in the drug treated group.

Results: The results are shown in the following tables:

TABLE 1
(Induced by Formalin)

| Test drugs | Dose (mg./kg.) | Inhibitory percent | | | |
|---|---|---|---|---|---|
| | | 1 hr. | 2 hrs. | 3 hrs. | Cutting |
| 3-[4-(2-hydroxyethyl)-1-piperazinylcarbonylmethyl]-5-chloro-2(3H)-benzothiazolinone. | 500 | 27.2 | 24.0 | 19.6 | 8.6 |
| | 250 | 27.2 | 27.2 | 28.4 | 52.0 |
| | 125 | 0.1 | 4.5 | 4.5 | 4.5 |
| Oxyphenylbutazone | 500 | | | | |
| | 250 | | | | 28.6 |
| | 125 | | | | 4.7 |

TABLE 2
(Induced by albumin)

| Test drugs | Dose (mg./kg.) | Inhibitory percent | | | |
|---|---|---|---|---|---|
| | | 1 hr. | 2 hrs. | 3 hrs. | Cutting |
| 3-[4-(2-hydroxyethyl)-1-piperazinylcarbonylmethyl]-5-chloro-2(3H)-benzothiazolinone. | 500 | 48.1 | 56.2 | 59.7 | 71.8 |
| | 250 | 31.4 | 34.2 | 40.6 | 51.2 |
| | 125 | 21.0 | 22.3 | 25.8 | 39.7 |
| Oxyphenylbutazone | 500 | | | | |
| | 250 | | | | 28.6 |
| | 125 | | | | 4.7 |

TABLE 3
(Induced by carrageenin)

| Test drugs | Dose (mg./kg.) | Inhibitory percent | | | | |
|---|---|---|---|---|---|---|
| | | 1 hr. | 2 hrs. | 3 hrs. | 4 hrs. | Cutting |
| 3-[4-(2-hydroxyethyl)-1-piperazinylcarbonylmethyl]-5-chloro-2(3H)-benzothiazolinone. | 500 | 56.3 | 57.7 | 55.9 | 50.0 | 57.1 |
| | 250 | 43.2 | 41.9 | 42.3 | 40.9 | 37.0 |
| | 125 | 39.0 | 7.9 | 16.7 | 12.2 | 13.1 |
| Oxyphenylbutazone | 500 | | | | | |
| | 250 | | | | | 47.4 |
| | 125 | | | | | 16.6 |

Note.—In the group which received oxyphenylbutazone at a dose of 500 mg./kg., no reliable value could be obtained due to death of almost all animals.

(b) The effect of some other compounds [I].—Method: The test was carried out in the same manner as above.
Results: The results are shown in the following table:

TABLE 4

| Test drugs | Dose (mg./kg.) | Inhibitory percent (cutting) Formalin | Albumin | Carrageenin |
|---|---|---|---|---|
| 5-Cl-benzothiazolinone, N-CH₂CONHCH₂CH(OH)CH₃ 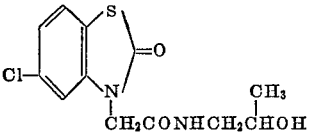 | 500<br>250<br>125 | 26.5<br>6.2<br>2.9 | 57.6<br>41.5<br>13.3 | −1.1<br>−4.2<br>0.4 |
| 5-Cl-benzothiazolinone, N-CH₂CONHCH₂OH 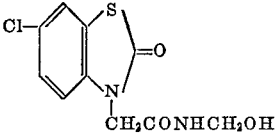 | 500<br>250<br>125 | 17.2<br>12.0<br>4.5 | | |
| 5-Cl-benzothiazolinone, N-CH₂CONHCH₂CH₂OCH₂CH₂OH 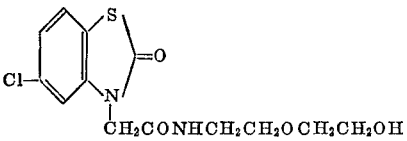 | 500<br>250<br>125 | | 39.3<br>17.6<br>10.3 | |
| 7-Cl-benzothiazolinone, N-CH₂CONHCH₂CH₂OH (CH₃ branch)  | 500<br>250<br>125 | | 26.1<br>22.4<br>0.2 | |
| 5-Cl-benzothiazolinone, N-CH₂CONH-C₆H₄-OH 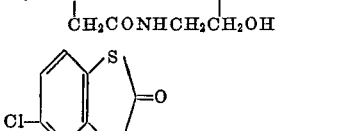 | 500<br>250<br>125 | −13.7<br>−29.0<br>−1.2 | 9.4<br>8.6<br>0.4 | 21.0<br>8.5<br>8.1 |
| 5-Cl-benzothiazolinone, N-CH₂CONHCH₂CH₂OC₂H₅ 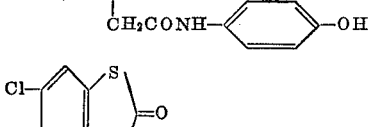 | 500<br>250<br>125 | 13.0<br>3.2<br>14.4 | | |
| 5-CF₃-benzothiazolinone, N-CH₂CONHCH₃ 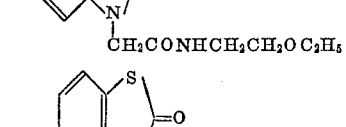 | 500<br>250<br>125 | | 28.8<br>28.3<br>14.2 | |

(2) The inhibitory effect of 3-[4-(2-hydroxyethyl)-1-piperazinylcarbonylmethyl] - 5 - chloro - 2(3H) - benzothiazolinone on inflammatory exudate induced by formalin.

Method: Wistar strain male rats each weighing 150 to 200 g. were divided into two groups. One group (10 rats) received orally 1 ml. of a suspension of the test drug in 1% carboxymethylcellulose solution per 100 g. of the body weight (the drug treated group); the other group (10 rats) received 1 ml. of 1% carboxymethylcellulose solution alone per 100 g. of the body weight in the similar fashion (control group). One hour after administration, foramlin (5%, 1 ml.) was given intraperitoneally to the animals to induce peritonitis. After 20 hours, the amount of ascitic fluid was measured. The rate of induced ascitic fluid and the inhibitory percent of induced ascitic fluid were calculated from the following equations:

Rate of induced ascitic fluid $=\frac{t-T}{T} \times 100$ (percent)

T: Amount of ascitic fluid before formalin being given.
t: Amount of ascitic fluid 20 hours after formalin being given.

Inhibitory percent of induced ascitic fluid
$$=\frac{C-D}{C} \times 100 \text{ (percent)}$$

C: Rate of induced ascitic fluid in control group.
D: Rate of induced ascitic fluid in the drug treated group.

Results: The results are shown in the following table:

TABLE 5

| Test drug | Dose (mg./kg.) | Inhibitory percent |
|---|---|---|
| 3-[4-(2-hydroxyethyl)-1-piperazinylcarbonylmethyl]-5-chloro-2(3H)-benzothiazolinone. | 500<br>250<br>125 | 34.7<br>47.2<br>−0.005 |
| Oxyphenylbutazone | 500<br>250<br>125 | <br><br>−4.9 |

Note.—In the groups which received oxyphenylbutazone at a dose of 500 mg./kg. and of 250 mg./kg., no measurement was made due to death of almost all animals.

(3) Gastric ulcer formation.
Method: Groups of ten Wistar strain male rats, each consisting of 10 animals, received orally 1 ml. of a suspension of the test drug in 1% carboxymethylcellulose solution per 100 g. of the body weight. After 10 hours, the same dose was further given orally, and 5 hours following this, the animals were observed macroscopically for the presence of gastric bleeding. Depending on the state of bleeding, the marks from 0 (no bleeding) to 5 (the severest bleeding) were given.

Results: The results are shown in the following table:

TABLE 6

| Test drug | Dose (mg./kg.) | 0 | 1 | 2 | 3 | 4 | 5 |
|---|---|---|---|---|---|---|---|
| 3-[4-(2-hydroxyethyl)-1-piperazinylcarbonylmethyl]-5-chloro-2(3H)-benzothiazolinone. | 500 | 1 | 5 | 2 | 1 | 0 | 0 |
|  | 250 | 5 | 4 | 1 | 0 | 0 | 0 |
|  | 125 | 5 | 4 | 0 | 0 | 0 | 0 |
| Phenylbutazone | 125 | 0 | 2 | 2 | 1 | 2 | 1 |

NOTE.—Of the group which received 500 mg./kg. of 3-[4-(2-hydroxyethyl)-1-piperazinylcarbonylmethyl]-5-chloro-2(3H)-benzothiazolinone, a rat was dead from unknown cause. Of the group given 250 mg./kg., a rat suffered from pneumonia. In the group given phenylbutazone, two animals were dead after the first administration.

rabbit or guinea pig heart, which was suspended in tyrode solution at 30° C. according to the Magnus method. A pair of electrodes from a square-wave electronic stimulator was inserted into the right atrial wall. A pulse of 0.5 millisecond duration at a frequency of 20/sec. was delivered by the electrodes and the voltage gradually increased until a threshold value for atrial fibrillation was determined. Aqueous solutions of the drugs were added into the bath. The effects on threshold voltage for fibrillation and on heart rate were determined.

Results: The results are shown in the following tables:

TABLE 7
(On rabbit heart)

| Concentration of test drug (g./ml.) | N-[2-(N,N-diethylamino)ethyl]-2-oxo-3-benzothiazolineacetamide | | Quinidine | | Procaine amide | |
|---|---|---|---|---|---|---|
|  | Average change from the control threshold voltage for atrial fibrillation, percent | Inhibitory percent of heart rate | Average change from the control threshold voltage for atrial fibrillation, percent | Inhibitory percent of heart rate | Average change from the control threshold voltage for atrial fibrillation, percent | Inhibitory percent of heart rate |
| $1 \times 10^{-6}$ | 0 | 4 |  |  |  |  |
| $2 \times 10^{-6}$ | 28 | 12 |  |  |  |  |
| $5 \times 10^{-6}$ | 117 | 7 | 0 | 0 |  |  |
| $1 \times 10^{-5}$ | 893 | 8 | 84 | 31 | 6 | 0 |
| $2 \times 10^{-5}$ |  |  | 146 | 39 |  |  |
| $5 \times 10^{-5}$ |  |  | 510 | 54 | 44 | 12 |
| $1 \times 10^{-4}$ |  |  | 600 | 40 | 97 | 18 |
| $1.5 \times 10^{-4}$ |  |  |  |  | 317 | 18 |
| $5 \times 10^{-4}$ |  |  |  |  | 1,300 | 21 |

As clearly seen from the above test results, the com-

TABLE 8
(On guinea pig heart)

| Concentration of test drug (g./ml.) | N-[2-(N,N-diethylamino)ethyl]-2-oxo-3-benzothiazolineacetamide | | Quinidine | | Procaine amide | | Ajmaline | |
|---|---|---|---|---|---|---|---|---|
|  | Average change from the control threshold voltage for atrial fibrillation, percent | Inhibitory percent of heart rate | Average change from the control threshold voltage for atrial fibrillation, percent | Inhibitory percent of heart rate | Average change from the control threshold voltage for atrial fibrillation, percent | Inhibitory percent of heart rate | Average change from the control threshold voltage for atrial fibrillation, percent | Inhibitory percent of heart rate |
| $1 \times 10^{-6}$ | 11 | 6 |  |  |  |  |  |  |
| $2 \times 10^{-6}$ | 25 | 5 |  |  |  |  |  |  |
| $5 \times 10^{-6}$ | 167 | 7 |  |  |  |  | 33 | 25 |
| $1 \times 10^{-5}$ | 112 | 5 | 85 | 21 |  |  | 205 | 28 |
| $2 \times 10^{-5}$ |  |  | 164 | 21 |  |  | 400 | 55 |
| $5 \times 10^{-5}$ |  |  | 251 | 69 |  |  |  |  |
| $1 \times 10^{-4}$ |  |  |  |  | 45 | 29 |  |  |
| $2 \times 10^{-4}$ |  |  |  |  |  |  |  |  |
| $5 \times 10^{-4}$ |  |  |  |  | 135 | 23 |  |  | pounds [I] are characterized by their potent antiinflammatory effect. Furthermore, the compounds [I] are less in side effects and may be safely applied to human beings.

Some of the compounds [I] are also useful as antiarrhythmic agents. Such utility are evidenced by the test results, some of which are shown below.

(1) The effect on the electrically induced atrial fibrillation

Method: During testing was carried out on the isolated (2) The effect on the arrhythmia induced by Lanatoside C Method: The test drug was administered to urethane-anesthetized guinea pigs intravenously or orally. After a certain time (5 minutes in intravenous injection or 1 hour in oral administration), the continuous injection of Lanatoside C into the jugular vein was started, such injection causing arrhythmia at a dose of about 600 μg./kg. and conducting cardiac arrest on further administration unless the previous medication was made. The effects of the test drug on the heart rate and Lanatoside C induced arrhythmia and cardiac arrest were observed.

Results: The results are shown in the following tables:

the jugular vein of pentobarbital anesthetized dog, during which electric stimulation was given to the right auricle for 1 minute so that atrial fibrillation was produced for several ten minutes or more. The minimal effective i.v.

TABLE 9 (ADMINISTRATION BY INTRAVENOUS ROUTE)

| | | | Heart rate | | Lanatoside C (μg/kg) | |
|---|---|---|---|---|---|---|
| | Dose (mg./kg.) | Number of animals | Before administration (beats/min.) | After administration (inhibitory percent) | Arrhythmia, mean ± S.E.[1] | Cardiac arrest, mean ±S.E.[1] |
| Control[2] | | 7 | | | 387±73 | 888±140 |
| N-[2-(N,N-diethylamino)ethyl]-2-oxo-3-benzothiazolineacetamide | 2 | 4 | 262 | 13 | 438±115 | 989±259 |
| | 5 | 5 | 267 | 17 | 634±155 | 920±80 |
| | 10 | 8 | 258 | 14 | 719±171 | 987±188 |
| Quinidine | 10 | 3 | 258 | 18 | 428±136 | 884±114 |
| Procaine amide | 5 | 3 | 212 | 6 | 400±43 | 775±205 |
| | 10 | 4 | 252 | 17 | 480±92 | 886±178 |
| Control[2] | | 5 | 256 | 0 | 404±64 | 1,199±108 |
| Ajmaline | 0.5 | 5 | 250 | 0.4 | 539±163 | 1,013±279 |
| | 1.0 | 5 | 262 | 4 | 618±302 | 1,048±91 |
| | 2.0 | 5 | 263 | 3 | 417±107 | 1,155±304 |
| | 5.0 | 5 | 266 | 1.5 | 448±132 | 1,013±341 |
| | 10.0 | 5 | 276 | 8 | 579±236 | 1,135±456 |

S.E.=Standard error.
[2] Physiological saline solution (0.5 ml.) was given.

TABLE 10
(Administration by oral route)

| | | | Lanatoside C (μg./kg.) | |
|---|---|---|---|---|
| Test drug | Dose (mg./kg.) | Number of animals | Arrhythmia, mean ±S.E. | Cardiac arrest, mean ±S.E. |
| Control[1] | | 3 | 402±69 | 857±133 |
| N-[2-(N,N-diethylamino)ethyl]-2-oxo-3-benzothiazolineacetamide | 4 | 4 | 419±37 | 1,124±192 |
| | 10 | 3 | 606±236 | 1,002±81 |
| | 20 | 4 | 988±209 | 1,470±282 |
| | 50 | 2 | 548±215 | 1,350±156 |

[1] Distilled water (2 ml.) was given.

(3) The prevention effect on the atrial fibrillation induced by acetylcholine

Method: Acetylcholine was continuously injected into dose of the test drug was determined by observing the disappearance of $f$ wave and the reappearance of $p$ wave on the electrocardiogram.

Results: The results are shown in the following table:

TABLE 11

| Test drug | Number of animals | Minimal effective dose (mg./kg.) |
|---|---|---|
| N-[2-(N,N-diethylamino)ethyl]-2-oxo-3-benzothiazolineacetamide | 5 | 2.5 |
| Quinidine | 5 | 6.7 |
| Procaine amide | 5 | 24.1 |
| Ajmaline | 6 | 6.2 |

(4) Toxicity

The test drug was administered to mice intraperitoneally or orally at a variety of doses. The symptoms observed are shown in the following table:

TABLE 12

| Test drug | Administration route | Dose (mg./kg.) | Symptoms |
|---|---|---|---|
| N-[2-(N,N-diethylamino)ethyl]-2-oxo-3-benzothiazolineacetamide. | Intraperitoneal | 25 | No special change. |
| | | 50 | Muscle relaxation; slight depression in movement activity; oppression in breathing. |
| | | 100 | Four deaths in 7 animals within 30 minutes. |
| | Oral | 50 | Muscle relaxation; slight to medial depression in corneal reflex. |
| | | 100 | Disturbance of gait; depression in grasping reflex; platycoria; oppression in breathing. |
| | | 200 | Ptosis. |
| | | 400 | Six deaths in 7 animals within 15 minutes. |
| Quinidine | Intraperitoneal | 50 | Slight to moderate muscle relaxation; ptosis. |
| | | 100 | Clear depression in consciousness, movement activity and grasping reflex. |
| | | 200 | Moderate oppression in breathing; two deaths in 7 animals within 24 to 48 hours. |
| | | 400 | Four deaths in 7 animals within 30 minutes. |
| | Oral | 100 | Moderate to strong ptosis. |
| | | 200 | Moderate to strong depression in consciousness and movement activity; muscle relaxation. |
| | | 400 | Stronger depression in the above. |
| | | 800 | Disturgance of gait. |
| | | 1,000 | Three deaths in 7 animals within 30 minutes. |
| Procaine amide | Intraperitoneal | 100 | Ptosis. |
| | | 200 | Clear depression in consciousness, movement activity and tonicity. |
| | | 400 | Seven deaths in 7 animals within 30 minutes. |
| | Oral | 100 | Ptosis. |
| | | 200 | Clear deperession in consciousness, movement activity and tonicity. |
| | | 400 | Do. |
| | | 800 | One death in 7 animals within 15 minutes. |
| Ajmaline | Intraperitoneal | 100 | Ptosis; muscle relaxation; one death in 7 animals within 15 minutes. |
| | | 200 | Five deaths in 7 animals within 15 minutes. |
| | Oral | 200 | Muscle relaxation; depression in movement activity. |
| | | 300 | Four deaths in 7 animals within 15 minutes. |

From the above test results, it can be seen that the toxicity of the compounds [I] is considerably low for their marked arrhythimic potency. Therefore, the compounds [I] may be applied to human beings with high safety.

Accordingly, the compounds [I] are useful in treatment of inflammatory conditions associated with pain, flare and/or swelling, which are provoked by changes in cellular and vascular permeability, vasodilation, exudation of liquid constitution of the blood and of cellular constitution, and/or proliferation of connective tissue cells and formation of granulation tissues. The compounds [I] are also useful in treatment of certain arrhythmias. Conversion of atrial fibrillation, abolition of paroxysmal atrial tachycardia, and management of ventricular ectopic beats represent typical examples of therapeutic amis.

The compounds [I] can be administered by the conventional methods, the conventional types of unit dosages or with the conventional pharmaceutical carriers to produce an antiinflammatory or antiarrhythmic effect in human beings and animals. Thus, they can be used in the form of pharmaceutical preparations, which contain them in admixture with a pharmaceutical organic or inorganic carrier material suitable for enteral, parenteral or local applications. Oral administration by the use of tablets, capsules or in liquid form such as suspensions, solutions or emulsions is particularly advantageous. When formed into tablets, the conventional binding and disintegrating agents used in therapeutic unit dosages can be employed. Illustrative of binding agents there can be mentioned glucose, lactose, gum acacia, gelatin, mannitol, starch paste, magnesium trisilicate and talc. Illustrative of disintegrating agents there can be mentioned corn starch, keratin, colloidal silica and potato starch. When administered as liquids the conventional liquid carriers can be used.

The unit dosage or therapeutically effective quantity of the compounds [I] for human beings for the therapeutic uses of the invention can vary over wide limits such as that of about 0.1 of a grain to about 25 grains or more such as 50 grains. The upper limit is limited only by the degree of effect desired and economic considerations. For oral administration it is preferable to employ from about 1 to about 10 grains of the therapeutic agent per unit dosage. It is indicated from animal experiments that about 1 to about 10 grain dosages administered orally four times daily as needed will provide a preferred daily dosage. Of course, the dosage of the particular therapeutic agent used can vary considerably, such as the age of the patient and the degree of therapeutic effect desired. Each unit dosage form of the novel therapeutic compounds can contain from about 5% to about 95% of the novel therapeutic agents by weight of the entire composition with the remainder comprising conventional pharmaceutical carriers. By the term pharmaceutical carrier it is intended to include non-therapeutic materials which are conventionally used with unit dosages and includes fillers, diluents, binders, lubricants, disintegrating agents and solvents. Of course, it is possible to administer the novel therapeutics, i.e. the pure compounds, without the use of a pharmaceutical carrier.

Practical and presently-preferred embodiments of this invention are illustratively shown in the following examples.

EXAMPLE 1

(A) A mixture of 5-chloro-2(3H)-benzothiazolinone (5.0 g.), 4'-hydroxy-2-chloroacetanilide (5.54 g.), potassium carbonate (3.75 g.) and acetone (20 ml.) is heated while refluxing for 6 hours. The reaction mixture is filtered while hot. The filtrate is concentrated to dryness. The residue is crystallized from ethyl acetate to give 4'-hydroxy-5-chloro-2-oxo - 3 - benzothiazolineacetanilide (4.2 g.) as crystals. M.P. 249 to 251° C.

(B) A mixture of 5-trifluoromethyl-2(3H)-benzothiazolinone (4.0 g.), 4'-ethoxy-2-chloroacetanilide (4.01 g.), potassium carbonate (3.5 g.), sodium iodide (trace) and acetone (120 ml.) is heated while refluxing for 6 hours. After removal of the acetone by distillation, the residue is admixed with water (200 ml.) and filtered. The collected crystals are recrystallized from ethanol to give 4'-ethoxy-5-trifluoromethyl-2-oxo - 3 - benzothiazolineacetanilide (3.4 g.) as crystals. M.P. 252 to 254° C.

Other examples of the compounds which can be prepared in the similar manner include:

4'-acetyl-5-chloro-2-oxo-3-benzothiazolineacetanilide (M.P. 282 to 283° C.),
4'-,5-dichloro,-2-oxo-3-benzothiazolineacetanilide (M.P. 241 to 242° C.),
5-trifluoromethyl-2-oxo-3-benzothiazolineacetamide (M.P. 227 to 229° C.),
2',6'-dimethyl-5-chloro-2-oxo-3-benzothiazoline-acetanilide (M.P. 284° C.),
3-[4-(2-hydroxyethyl)-1-piperazinylcarbonylmethyl]-5-chloro-2(3H)-benzothiazolinone (M.P. 159 to 161° C.),
3-(4-hydroxypiperizinocarbonylmethyl)-5-chloro-2(3H)-benzothiazolinone (M.P. 178 to 181° C.),
N-[2-(N,N-diethylamino)ethyl]-2-oxo-3-benzothiazoline-acetamide (maleate, M.P. 138.5 to 139.5° C.),
3-[4-(2-hydroxyethyl)-1-piperazinylcarbonylmethyl]-2(3H)-benzothiazolinone (maleate, M.P. 197 to 198° C.),
3-(4-methyl-1-piperazinylcarbonylmethyl)-5-chloro-2(3H)-benzothiazolinone (M.P. 178 to 179° C.),
3-morpholinocarbonylmethyl-5-chloro-2(3H)-benzothiazolinone (M.P. 199 to 200° C.),
3-(4-phenyl-1-piperazinylcarbonylmethyl)-5-trifluoromethyl-2(3H)-benzothiazolinone (M.P. 188 to 190° C.),
3-(4-methyl-1-piperazinylcarbonylmethyl)-5-trifluoromethyl-2(3H) benzothiazolinone (M.P. 193 to 195° C.),
3-[4-(2-hydroxyethyl)-1-piperazinylcarbonylmethyl]-5-trifluoromethyl-2(3H)-benzothiazolinone M.P. 166 to 167.5° C.),
3-(4-methyl-1-homopiperazinyl/carbonylmethyl/)-5-chloro-2(3H)-benzothiazolinone (M.P. 136 to 137.5° C.),
N-(2-hydroxyethyl)-6-chloro-2-oxo-3-benzothiazoline-acetamide (M.P. 222 to 223° C.),
N-methyl-5-trifluoromethyl-2-oxo-3-benzothiazolin-acetamide (M.P. 223 to 224° C.),
5-chloro-2-oxobenzothiazolin-3-ylacetylglycine ethyl ester (M.P. 194.5 to 195.5° C.),
5-chloro-2-oxobenzothiazolin-3-ylacetylglycine (M.P. 246 to 247° C.),
3-(4-acetylmethyl-1-piperazinylcarbonylmethyl)-5-chloro-2(3H)-benzothiazolinone (M.P. 158 to 160° C.),
3-[2,5-dimethyl-4-(2-propinyl)-1-piperazinylcarbonylmethyl]-5-chloro-2(3H)-benzothiazolinone M.P. 145 to 146° C.),
3-[2,5-dimethyl-4-(1-ethoxycarbonylmethyl)-1-piperazinylcarbonylmethyl]-5-chloro-2(3H)-benzothiazolinone (M.P. 131 to 138° C.),
3-[2,5-dimethyl-4-(2-hydroxyethyl)-1-piperazinylcarbonylmethyl]-5-chloro-2(3H)-benzothiazolinone (M.P. 139 to 141° C.),
3-(4-benzoyl-1-piperazinylcarbonylmethyl)-5-trifluoromethyl-3(2H)-benzothiazolinone (M.P. 183 to 184° C.),
3-[[4-(2-hydroxyethyl)-1-piperazinylcarbonyl]-1-ethyl]-5-chloro-benzothiazolinone (M.P. 8 to 92° C.),
1-[4-(2-hydroxyethyl)-1-piperazinylcarbonylmethyl]-3-methyl-6-chloro-2(3H)-benzimidazolinone M.P. 172 to 174° C.), 1-[4-(2-hydroxyethyl)-1-piperazinylcarbonylmethyl]-3-methyl-5-chloro-2(3H)-benzimidazolinone (M.P. 171 to 173° C.),
1-[4-(2-hydroxypropyl)-1-piperazinylcarbonylmethyl]-3-methyl-6-chloro-2(3H)-benzoimidazolinone (M.P. 202 to 206° C.),
3-[4-(2-hydroxypropyl)-1-piperazinylcarbonylmethyl]-5-chloro-2(3H)-benzothiazolinone (M.P. 104 to 105° C.),
3-[4-(2-hydroxyethyl)-1-piperazinylcarbonylmethyl]-6-ethoxy-2(3H)-benzothiazolinone (M.P. 154 to 155° C.), etc.

EXAMPLE 2

(A) A mixture of ethyl 2-oxo-3-benzothiazoline-acetate (1.2 g.), 2-(N,N-diethylamino)ethylamine (1.0 g.) and anhydrous ethanol (1.0 g.) is heated while refluxing for 48 hours. After removal of the ethanol by distillation, the residue is extracted with dilute hydrochloric acid. The extract is made alkaline with 10% sodium hydroxide solution and shaken with chloroform. The chloroform layer is washed with water, dried and concentrated. The residue is crystallized from ethanol to give N-[2-(N,N-diethylamino)ethyl]-2-oxo-3-benzothiazolineacetamide (2.0 g.) as colorless scales. M.P. 138.5 to 139.5° C. This base is treated with maleic acid in a conventional manner to afford the maleate. M.P. 125 to 128° C.

(B) A solution of ethyl 2-oxo-3-benzothiazolineacetate (600 mg.) in excess of 1-(2-hydroxyethyl)piperazine is heated at 100° C. for about 20 hours. After cooling, a large amount of water is added thereto, and the resulting mixture is extracted with chloroform. The chloroform extract is washed with water and shaken with 10% hydrochloric acid. The hydrochloric acid layer is washed with ether, made alkaline with 20% sodium hydroxide solution and extracted with chloroform. The chloroform extract is washed with water, dried and concentrated. The residue is crystallized from ethanol to give 3-[4-(2-hydroxyethyl) - 1 - piperazinylcarbonylmethyl] - 2(3H)-benzothiazolinone as crystals. M.P. 197 to 198° C. (maleate).

(C) A mixture of ethyl 5 - trifluoromethyl - 2 - oxo-3-benzothiazolineacetate (1.5 g.) and morpholine (6.0 g.) is heated at 110° C. for 15 hours while stirring. After cooling, the reaction mixture is combined with chloroform and washed with water, dilute hydrochloric acid and water in order. The chloroform solution is dried over magnesium sulfate and concentrated. The residue is crystallized from ethanol to give 3-morpholinocarbonylmethyl-5-trifluoromethyl-2(3H)-benzothiazolinone (0.65 g.) as white needles. M.P. 188 to 190° C.

(D) A solution of ethyl 5-chloro-2-oxo-3-benzo-thiazolineacetate (4.0 g.) in 1-(2-hydroxyethyl)piperazine is heated at 100 C. for 24 hours. After cooling, the resulting mixture is extracted with chloroform. The chloroform extract is washed with water and shaken with 10% hydrochloric acid. The hydrochloric acid layer is washed with chloroform, made alkaline with 10% sodium hydroxide solution and extracted with chloroform. The chloroform extract is washed with water, dried over magnesium sulfate and concentrated. The residual oil (5.5 g.) is allowed to stand to form crystals, which are recrystallized from a mixture of ethyl acetate (40 ml.) and ethanol (15 ml.) to give 3-[4-(2-hydroxyethyl)-1-piperazinylcarbonylmethyl]-5-chloro-2(3H)-benzothiazolinone (3.2 g.) as colorless crystals, M.P. 159 to 161° C.

Other examples of the compounds which can be prepared in the similar manner include:

N-[2-(N,N-diethylamino)-ethyl]-5-chloro-2-oxo-3-benzothiazolineacetamide (M.P. 127 to 128° C.; maleate, M.P. 119 to 121°C.),
N-(2-morpholinoethyl)-2-oxo-3-benzothiazolineacetamide (M.P. 169 to 170° C).
N-[3-(N,N-dimethylamino)propyl]-2-oxo-3-benzothiazolineacetamide (maleate, M.P. 155 to 156° C.),
3-(4-methyl-1-piperazinylcarbonylmethyl)-5-chloro-2(3H)-benzothiazolinone (M.P. 178 to 179° C.),
3-(4-phenyl-1-piperazinylcarbonylmethyl)-5-chloro-2(3H)-benzothiazolinone (M.P. 179 to 180° C.),
3-morpholinocarbonylmethyl-5-chloro-2(3H)-benzothiazolinone (M.P. 199 to 200° C.),
N-[2-(N,N-diethylamino)ethyl]-6-methyl-2-oxo-3-benzothiazolineacetamide (maleate, M.P. 113 to 114.5° C.),
N-[2-(N,N-diethylamino)ethyl]-6-ethoxy-2-oxo-3-benzothiazolineacetamide (M.P. 131° C.),
3-(4-phenyl-1-piperazinylcarbonylmethyl)-5-trifluoromethyl-2(3H)-benzothiazolinone (M.P. 188 to 190° C.),
3-(4-methyl-1-piperazinylcarbonylmethyl)-5-trifluoromethyl-2(3H)-benzothiazolinone (M.P. 193 to 185° C.),
3-[4-(2-hydroxyethyl)-1-piperazinylcarbonylmethyl]-5-trifluoromethyl-2(3H)-benzothiazolinone (M.P. 166 to 167.5° C.),
3-[4-(2-hydroxyethyl)-1-piperazinylcarbonylmethyl]-4-chloro-2(3H)-benzothiazolinone (M.P. 189 to 191° C.),
3-[4-(2-hydroxyethyl)-1-piperazinylcarbonylmethyl]-6-chloro-2(3H)-benzothiazolinone (M.P. 171 to 173° C.),
3-(4-methyl-1-diazepinyl)-5-chloro-2(3H)-benzothiazoninone (M.P. 136 to 137.5° C.),
1-[4-(2-hydroxyethyl)-1-piperazinylcarbonylmethyl]-3-methyl-5-chloro-2(3H)-benzimidazolinone (M.P. 171 to 173° C.),
3-(4-hydroxypiperidinocarbonylmethyl)-5-trifluoromethyl-2-(3H)-benzothiazolinone (M.P. 197 to 199° C.),
3-[4-(2-hydroxyethyl)-1-piperazinylcarbonylmethyl]-4-chloro-2(3H)-benzothiazolinone (M.P. 189 to 191° C.),
4'-hydroxy-5-chloro-2-oxo-3-benzothiazolineacetanilide (M.P. 249 to 251° C.),
5-trifluoromethyl-2-oxo-3-benzothiazolineacetamide (M.P. 227 to 229° C.),
N-(2-hydroxyethyl)-6-chloro-2-oxo-3-benzothiazolineacetamide (M.P. 222 to 223° C.),
3-(1-piperazinyl)carbonyl-methyl-5-chloro-2(3H)-benzothiazolinone (M.P. 211 to 212° C.),
3-[4-(2-hydroxypropyl)-1-piperazinylcarbonylmethyl]-5-chloro-2(3H)-benzothiazolinone (M.P. 104 to 105° C.),
3-(4-acetylmethyl-1-piperazinylcarbonyl-methyl)-5-chloro-2(3H)-benzothiazolinone (M.P. 158 to 160° C.),
3-[2,5-dimethyl-4-(2-propinyl)-1-piperazinylcarbonylmethyl]-5-chloro-2(3H)-benzothiazolinone (M.P. 145 to 146° C.),
3-[4-(3-hydroxypropyl)-1-piperazinylcarbonylmethyl]-5-chloro-2(3H)-benzothiazolinone (M.P. 118 to 120° C.),
3-(2,4,5-trimethyl-1-piperazinylcarbonylmethyl)-5-chloro-2(3H)-benzothiazolinone (M.P. 167 to 173° C.),
3-(4-benzyl-1-piperazinylcarbonylmethyl)-5-chloro-2(3H)-benzothiazoline (M.P. 152 to 154° C.),
3-(4-benzyl-1-piperazinylcarbonylmethyl)-5-trifluoromethyl-2(3H)-benzothiazolinone (M.P. 183 to 184° C.),
3-[4-(2-hydroxyethyl)-1-piperazinylcarbonylmethyl]-7-chloro-2(3H)-benzothiazolinone (M.P. 170 to 172° C.),
3-[[4-(2-hydroxyethyl)-1-piperazinyl-carbonylmethyl]-1-ethyl]-5-chloro-2(3H)-benzothiazolinone (M.P. 89 to 92° C.),
N-[2-[N-methyl-N-(2-hydroxyethyl)amino[ethyl]-5-chloro-2-oxo-3-benzothiazolinacetamide (M.P. 120 to 122° C.),
N-(2-hydroxypropyl)-6-chloro-2-oxo-3-benzothiazolinacetamide (M.P. 169 to 173° C.),
3-[4-(2-hydroxyethyl)-1-piperazinylcarbonylmethyl]-6- ethoxy-2(3H)-benzothiazolinone (M.P. 154 to 155° C.), etc.

EXAMPLE 3

(A) A mixture of 6-chloro-2-oxo-3-benzothiazolineacetic acid (5.04 g.) and thionyl chloride (50 ml.) is heated while refluxing for 2 hours, and the thionyl chloride is distilled off. Thus obtained 6-chloro-2-oxo-3-benzothiazolineacetyl chloride is dissolved in a mixture of benzene (60 ml.) and chloroform (30 ml.), and the resultant solution is dropwise added to a mixture of benzene (12 ml.), 2-aminoethanol (3.4 g.), water (5.6 ml.) and sodium carbonate (1.4 g.) cooled with ice-water while stirring. The resulting mixture is stirred at room temperature for 40 minutes and, after addition of water (70 ml.), for several minutes. The precipitate is collected by filtration, washed with water and recrystallized from a mixture of ethanol and chloroform to give N-(2-hydroxyethyl)-6-chloro-2-oxo - 3 - benzothiazolineacetamide (2.0 g.) as white cotton-like crystals, M.P. 222 to 223° C.

(B) A mixture of 5-chloro - 2 - oxo-3-benzothiazolineacetic acid (4.4 g.) and thionyl chloride is heated while refluxing for several hours, and the thionyl chloride is distilled off. The obtained 5-chloro - 2 - oxo-3-benzothiazolinylacetyl chloride is dissolved in benzene, and the resultant solution is dropwise added to a mixture of 2-(2-aminoethoxy)ethanol (4.0 g.), sodium carbonate (2.2 g.), water (12 ml.) and benzene (40 ml.) cooled in an ice-water bath while stirring. The resulting mixture is stirred at room temperature for 3 hours and at 60° C. for 30 minutes. After cooling, the separated crystals are collected by filtration and recrystallized from water to give N - [2 - (2 - hydroxyethoxy)ethyl]-5-chloro-2-oxo-3-benzothiazolineacetamide (3.6 g.) as colorless scales. M.P. 133 to 134° C.

Other examples of the compounds which can be prepared in the similar manner include:

N-methyl-5-trifluoromethyl-2-oxo-3-benzothiazolineacetamide (M.P. 223 to 224° C.),
N,N-diethyl-5-chloro-2-oxo-3-benzothiazolineacetamide (M.P. 148 to 149° C.),
N-(2-hydroxypropyl)-7-chloro-2-oxo-3-benzothiazolineacetamide (M.P. 189 to 191° C.),
N-(2-hydroxypropyl)-5-chloro-2-oxo-3-benzothiazolineacetamide (M.P. 155 to 156° C.),
N-(2-hydroxyethyl)-5-chloro-2-oxo-3-benzothiazolineacetamide (M.P. 223 to 224° C.),
N-(2-hydroxyethyl)-N-methyl-5-chloro-2-oxo-3-benzothiazolineacetamide (M.P. 115 to 117° C.),
3-(1-piperazinyl)carbonylmethyl-5-chloro-2(3H)-benzothiazolinone (M.P. 211 to 212° C.),
5-chloro-2-oxobenzothiazolin-3-ylacetylglycine ethyl ester (M.P. 194.5 to 195.5° C.),
5-chloro-2-oxobenzothiazolin-3-yl-acetyl-β-alanine ethyl ester (M.P. 150 to 151° C.)
5-chloro-2-oxobenzothiazolin-3-ylacetylglycine (M.P. 246 to 247° C.),
5-chloro-2-oxobenzothiazolin-3-ylacetyl-β-alanine (M.P. 187 to 189° C.),
3-[4-(2-hydroxyethyl)-1-piperazinylcarbonylmethyl]-6-chloro-2(3H)-benzothiazolinone (M.P. 174 to 176° C.),
3-[4-(2-hydroxyethyl)-1-piperazinylcarbonyl-methyl]-5-chloro-2(3H)-benzothiazolinone (M.P. 159 to 161° C.),
3-(4-hydroxypiperizinocarbonylmethyl)-5-chloro-2(3H)-benzothiazolinone (M.P. 178 to 181° C.),
N-[2-(N,N-diethylamino)-ethyl]-2-oxo-3-benzothiazolineacetamide (M.P. 138.5 to 139.5° C.),
3-[4-(2-hydroxyethyl)-1-piperazinylcarbonylmethyl]-2(3H)-benzothiazolinone (maleate, M.P. 197 to 198° C.),
3-morpholinocarbonylmethyl-5-trifluoromethyl-2(3H)-benzothiazolinone (M.P. 188 to 190° C.),
3-(4-methyl-1-piperazinylcarbonylmethyl)-5-chloro-2(3H)-benzothiazolinone (M.P. 178 to 179° C.),
3-(4-phenyl-1-piperazinylcarbonylmethyl)-5-trifluoromethyl-2(3H)-benzothiazolinone (M.P. 188 to 190° C.),
3-(4-methyl-1-homopiperazinylcarbonylmethyl)-5-chloro-2-(3H)-benzothiazolone (M.P. 136 to 137.5° C.),
N-(2-ethoxyethyl)-5-chloro-2-oxo-3-benzothiazolineacetamide (M.P. 171 to 173° C.),
3-[4-(2-hydroxypropyl)-1-piperazinylcarbonylmethyl]-5-chloro-2(3H)-benzothiazolinone (M.P. 104 to 105° C.),
1-[4-(2-hydroxyethyl)-1-piperazinylcarbonylmethyl]-3-methyl-5-chloro-2(3H)-benzimidazolinone (M.P. 171 to 173° C.),
1-[4-(2-hydroxyethyl)-1-piperazinylcarbonylmethyl]-3-methyl-6-chloro-2(3H)-benzoimidazolinone (M.P. 172 to 174° C.),
3-[4-(2-hydroxypropyl)-1-piperazinylcarbonylmethyl]-3-methyl-6-chloro-2(3H)-benzoimidazolinone (M.P. 202 to 206° C.),
3-(4-acetylmethyl-1-piperazinylcarbonylmethyl)-5-chloro-2(3H)-benzothiazolinone (M.P. 158 to 160° C.),
3-[2,5-dimethyl-4-(2-propinyl)-1-piperazinylcarbonylmethyl]-5-chloro-2(3H)-benzothiazolinone (M.P. 145 to 146° C.),
3-[4-(3-hydroxypropyl)-1-piperazinylcarbonylmethyl]-5-chloro-2(3H)-benzothiazolinone (M.P. 118 to 120° C.),
3-(2,4,5-trimethyl-1-piperazinylcarbonylmethyl)-5-chloro-2(3H)-benzothiazolinone (M.P. 167 to 173° C.),
3-(4-benzyl-1-piperazinylcarbonylmethyl)-5-chloro-2(3H)-benzothiazolinone (M.P. 152 to 154° C.),
3-(4-benzyl-1-piperazinylcarbonylmethyl)-5-trifluoromethyl-2(3H)-benzothiazolinone (M.P. 183 to 184° C.),
3-[4-(2-hydroxyethyl)-1-piperazinylcarbonylmethyl]-7-chloro-2(3H)-benzothiazolinone (M.P. 170 to 172° C.),
3-[[4-(2-hydroxyethyl)-1-piperazinylcarbonylmethyl]-1-ethyl]-5-chloro-2(3H)-benzothiazolinone (M.P. 89 to 92° C.),
N-[2-[N-methyl-N-(2-hydroxyethyl)amino]ethyl-5-chloro-2-oxo-3-benzothiazolinacetamide (M.P. 120 to 122° C.),
N-(2-hydroxypropyl)-6-chloro-2-oxo-3-benzothiazolinacetamide (M.P. 169 to 173° C.),
3-[4-(2-hydroxyethyl)-1-piperazinylcarbonylmethyl]-6-ethoxy-2(3H)-benzothiazolinone (M.P. 154 to 155° C.), etc.

EXAMPLE 4

(A) A mixture of 5 - chloro-2-oxo-3-benzothiazolineacetic acid (5.0 g.) and thionyl chloride (50 ml.) is heated while refluxing for 2 hours, and the thionyl chloride is distilled off. The thus obtained 5-chloro-2-oxo-benzothiazolineacetyl chloride is dissolved in anhydrous benzene (50 ml.), and the resultant solution is dropwise added to a mixture of anhydrous benzene (100 ml.), aziridine (2.3 g.), potassium carbonate (5.03 g.) and water (15 ml.) cooled at 5 to 10° C. while stirring. The resulting mixture is stirred at the same temperature for 10 minutes. The reaction mixture is washed with 10% sodium carbonate solution and water in order and dried over magnesium sulfate. After removal of the solvent, the residue is crystallized from anhydrous benzene to give 5-chloro-3-(1-aziridinylcarbonylmethyl)-2(3H)-benzothiazolinone (5.0 g.) as white granules. M.P. 137 to 139° C.

(B) 5 - chloro-3-(1-aziridinyl)carbonylmethyl-2(3H)-benzothiazolinone (5.2 g.) as above prepared is added to 99% ethanol (60 ml.), and the resulting mixture is heated while refluxing for 10 minutes. The reaction mixture is allowed to cool. The separated crystals are collected by filtration to give N-(2-ethoxyethyl)-5-chloro-2-oxo-3-benzothiazolineacetamide (3.2 g.) as white scales. M.P. 171 to 173° C.

(C) 5 - chloro-3-(1-aziridinylcarbonylmethyl)-2(3H)-benzothiazolinone (0.7 g.) as above prepared is added to N,N-dicyclohexylamine (1.5 g.), and the resulting mixture is heated at 110° C. for 20 hours. The reaction mixture is allowed to cool. The separated crystals are collected by filtration, washed with benzene and petroleum benzin in order and recrystallized from ethanol to give N-[2 - (N,N-dicyclohexylamino)-ethyl]-5-chloro-2-oxo-3-benzothiazolineacetamide (0.5 g.) as white crystals. M.P. 209 to 210° C.

(D) A mixture of 5 - chloro-2-oxo-3-benzothiazolineacetic acid (2.0 g.) and thionyl chloride (20 ml.) is heated while refluxing for 2 hours, and the thionyl chloride is distilled off. The thus obtained 5 - chloro-2-oxo-3-benzothiazolineacetyl chloride is dissolved in anhydrous benzene (20 ml.), and the resultant solution is dropwise added to a mixture of aziridine (0.424 g.) and anhydrous benzene (10 ml.) kept at 10 to 15° C. while stirring. The resulting mixture is stirred at room temperature for 3 hours and allowed to stand overnight. After removal of the solvent, the residue is dissolved in a mixture of water (50 ml.) and 10% sodium hydrogen carbonate solution (80 ml.), and the resulting solution is stirred for several minutes. The separated crystals are collected by filtration, washed with water, dissolved in a mixture of ethanol (70 ml.) and acetone (30 ml.) and treated with active carbon. Then, the solution is concentrated to about 60 ml. and allowed to stand overnight. The separated crystals are collected by filtration and recrystallized from ethanol to give N - (2-chloroethyl)-5-chloro-2-oxo-3-benzothiazolineacetamide (1.2 g.) as white crystals. M.P. 192 to 194° C.

(E) 2-oxo-3-benzothiazolineacetic acid is treated as above to give N-(2-chloroethyl)-2-oxo-3-benzothiazolineacetamide. M.P. 159 to 162° C.

EXAMPLE 5

(A) N-(2-chloroethyl)-5-chloro-2-oxo - 3 - benzothiazolineacetamide (1.0 g.) and N-methylaniline (1.62 g.) are charged in a steel bomb tube and heated at 90° C. for 5.5 hours. Then, 10% hydrochloric acid and ethyl acetate are added thereto. The ethyl acetate layer is extracted with 10% hydrochloric acid. The hydrochloric acid extract and the hydrochloric acid layer are combined together, washed with ethyl acetate and made alkaline with 10% sodium hydroxide solution. The separated crystals are extracted with chloroform. The chloroform extract is washed with water, dried over anhydrous magnesium sulfate and concentrated. The oily residue is crystallized from petroleum benzin and recrystallized from ethanol to give N-[2-(N-methylanilino)ethyl]-5-chloro-2-oxo-3-benzothiazolineacetamide (0.45 g.) as white crystals. M.P. 155 to 157° C.

(B) N-(2-chloroethyl) - 2 - oxo - 3 - benzothiazolineacetamide (3.0 g.) and N-methylaniline (4.75 g.) are charged in a steel bomb tube and heated at 110° C. for 5.5 hours. The reaction mixture is treated as above. The obtained pale brown crystals (6.7 g.) are recrystallized from ethanol to give N-[2-(N-methylanilino)ethyl]-2-oxo-3-benzothiazolineacetamide (2.5 g.) as white needles. M.P. 143 to 145° C.

EXAMPLE 6

To a solution of 3 - (1-piperazinylcarbonylmethyl)-5-chloro-2-(3H)-benzothiazolinone (0.45 g.) in methanol (30 ml.), there is added propylene oxide (0.25 g.), and the resulting mixture is heated at 50° C. for 5 hours, during which propylene oxide (0.3 g.) is added twice thereto. The reaction mixture is concentrated under reduced pressure. The residual oil is crystallized from petroleum benzin and recrystallized from a mixture of ethyl acetate and petroleum benzin to give 3-[4-(2-hydroxypropyl)-1-piperazinylcarbonylmethyl] - 5 - chloro-2(3H)-benzothiazolinone (0.43 g.) as colorless needles. M.P. 112 to 115° C. Other examples of the compounds which can be prepared in the similar manner include:

3-[4-(2-hydroxyethyl)-1-piperazinylcarbonylmethyl]-5-chloro-2(3H)-benzothiazolinone (M.P. 159 to 161° C.),
3-[4-(2-hydroxyethyl)-1-piperazinylcarbonylmethyl]-6-chloro-2(3H)-benzothiazolinone (M.P. 175 to 177° C.),
3-[4-(2-hydroxyethyl)-1-piperazinylcarbonylmethyl]-5-trifluoromethyl-2(3H)-benzothiazolinone (M.P. 166 to 167.5° C.),
3-[4-(2-hydroxyethyl)-1-piperazinylcarbonylmethyl]-4-chloro-2(3H)-benzothiazolinone (M.P. 189 to 191° C.),
N-(2-hydroxyethyl)-6-chloro-2-oxo-3-benzothiazolinacetamide (M.P. 222 to 223° C.),
N-(2-hydroxypropyl)-7-chloro-2-oxo-3-benzothiazolineacetamide (M.P. 189 to 191° C.),
N-(2-hydroxypropyl)-5-chloro-2-oxo-3-benzothiazolineacetamide (M.P. 155 to 156° C.),
N-(2-hydroxyethyl)-5-chloro-2-oxo-3-benzothiazolineacetamide (M.P. 223 to 224° C.),
1-[4-(2-hydroxyethyl)-1-piperazinylcarbonyl-3-methyl-6-chloro-2(3H)-benzimidazolinone (M.P. 172 to 174° C.),
1-[4-(2-hydroxypropyl)-1-piperazinylcarbonylmethyl]-3-methyl-6-chloro-2(3H)-benzoimidazolinone (M.P. 202 to 206° C.),
3-[4-(2-hydroxyethyl)-1-piperazinylcarbonylmethyl]-6-ethoxy-2(3H)-benzothiazolinone (M.P. 154 to 155° C.),
3-[4-(2-hydroxybutyl)-1-piperazinylcarbonylmethyl]-5-chloro-2(3H)-benzothiazolinone (M.P. 95 to 98° C.), etc.

EXAMPLE 7

A mixture of 3 - (1 - piperazinyl)carbonylmethyl-5-chloro-2(3H)-benzothiazolinone (500 mg.), anhydrous potassium carbonate (400 mg.), 2-hydroxyethyl bromide (300 mg.) and anhydrous ethanol (20 ml.) is heated while refluxing for 5 hours. The reaction mixture is concentrated under reduced pressure. The residue is extracted with chloroform. The chloroform layer is dried over magnesium sulfate and concentrated. The residue is crystallized from a mixture of ethyl acetate and ethanol to give 3 - [4 - (2 - hydroxyethyl]-1-piperazinylcarbonylmethyl]-5-chloro-2(3H)-benzothiazolinone (370 mg.) as crystals. M.P. 159 to 160° C.

Other examples of the compounds which can be prepared in the similar manner using 4,5,6 or 7-substituted or unsubstituted - 3 - (1-piperazinyl)carbonyl(lower)-alkyl-2(3H)-benzothiazolinone as the starting compound include:

3-[4-(1-ethoxycarbonylethyl)-1-piperazinylcarbonylmethyl]-5-chloro-2(3H)-benzothiazolinone (maleate, M.P. 152 to 154° C.),
3-(4-acetylmethyl-1-piperazinylcarbonylmethyl)-5-2(3H)-benzothiazolinone (M.P. 158 to 160° C.),
3-[4-(3-hydroxypropyl)-1-piperazinylcarbonylmethyl]-5-chloro-2(3H)-benzothiazolinone (M.P. 118 to 120° C.),
3-[2,5-dimethyl-4-(1-ethoxycarbonylmethyl)-1-piperazinylcarbonylmethyl]-5-chloro-2(3H)-benzothiazolinone (M.P. 131 to 138° C.),
3-[2,5-dimethyl-4-(2-propinyl)-1-piperazinylcarbonylmethyl]-5-chloro-2(3H)-benzothiazolinone (M.P. 145 to 146° C.),
3-(2,5-dimethyl-4-allyl-1-piperazinylcarbonyl-methyl)-5-chloro-2(3H)-benzothiazolinone (M.P. 136 to 137° C.),
3-(2,4,5-trimethyl-1-piperazinylcarbonylmethyl)-5-chloro-2(3H)-benzothiazolinone (M.P. 167 to 173° C.), 3-[2,5-dimethyl-4-(2-hydroxyethyl)-1-piperazinyl-
carbonylmethyl]-5-chloro-2(3H)-benzothiazolinone
(M.P. 139 to 140° C.),
3-[4-(3',4'-dimethoxyphenethyl)-1-piperazinylcar-
bonylmethyl]-5-chloro-2(3H)-benzothiazolinone
(M.P. 189 to 191° C.),
3-(4-acetylmethyl-1-piperazinylcarbonylmethyl)-
5-trifluoromethyl-2(3H)-benzothiazolinone (M.P. to
172° C.), etc.

EXAMPLE 8

To a mixture of 3-[4-(2-hydroxyethyl)-1-piperazinyl-carbonylmethyl]-5-chloro-2(3H)-benzothiazolinone (1.42 g.), potassium carbonate (1.4 g.) and chloroform (40 ml.), there is dropwise added a mixture of acetyl chloride (0.8 g.) and tetrahydrofuran (5 ml.) while cooling in about 30 minutes. The resultant mixture is stirred at room temperature for 6 hours. The reaction mixture is washed with water, dried and concentrated to give 3-[4-(2-acetyl-oxyethyl) - 1 - piperazinylcarbonylmethyl] - 5 - chloro-2(3H)-benzothiazolinone as colorless oil. The oil is treated with maleic acid, and the resulting maleate is crystallized from ethanol to give colorless scales. M.P. 199.5 to 200° C.

Other examples of the compounds which can be prepared in the similar manner include:

3-[4-[2-isobutyryloxy-propyl]-1-piperazinylcarbonyl-
methyl]-5-chloro-2-(3H)-benzothiazolinone (M.P.
123 to 125° C.),
3-[4-[2-isobutyryloxy-ethyl]-1-piperazinylcarbonyl-
methyl]-5-chloro-2(3H)-benzothiazolinone (M.P.
111 to 113° C.),
3-[4-(2-acetyloxypropyl)-1-piperazinylcarbonylmeth-
yl]-5-chloro-2(3H)-benzothiazolinone (hydrochlo-
ride, M.P. 248 to 249° C.),
3-[4-(2-isobutyryloxyethyl)-1-piperazinylcarbonylmeth-
yl]-6-ethoxy-2(3H)-benzothiazolinone (M.P. 97
to 99° C.),
3-[4-(2-palmitoyloxyethyl)-1-piperazinylcarbonylmeth-
yl]-5-chloro-2(3H)-benzothiazolinone (M.P. 84 to
86° C.),
3-[4-(2-palmitoyloxypropyl)-1-piperazinylcarbonyl-
methyl]-5-chloro-2(3H)-benzothiazolinone (M.P. 94
to 95° C.),
3-[4-(2-palmitoyloxyethyl)-1-piperazinylcarbonylmeth-
yl]-6-ethoxy-2(3H)-benzothiazolinone, etc.

EXAMPLE 9

To a solution of 3-(4-acetylmethyl-1-piperazinylcar-bonylmethyl)-5-chloro-2-(3H) - benzothiazolinone (0.3 g.) in methanol (15 ml.), there is added portionwise sodium borohydride (0.3 g.) at room temperature, and the resultant mixture is allowed to stand for 30 minutes. After removal of the methanol from the reaction mixture by distillation, the residue is admixed with water (20 ml.), and the aqueous layer is extracted with ethyl acetate. The extract is dried and concentrated. Petroleum benzene is added to the residue so that oil is precipitated. The oil is collected by decantation, solidified and crystallized from a mixture of ethyl acetate and petroleum benzene to give 3-[4-(2-hydroxypropyl)-1-piperazinylcar-bonylmethyl]-5-chloro-2(3H)-benzothiazolinone (0.2 g.) as colorless crystals, M.P. 104 to 105° C.

Other examples of the compounds which can be prepared in the similar manner include:

3-[4-(2-hydroxypropyl)-1-piperazinylcarbonylmethyl]-
5-trifluoromethyl-2(3H)-benzothiazolinone (M.P.
152.5 to 154° C.),
1-[4-(2-hydroxypropyl)-1-piperazinylcarbonylmethyl]-
6-chloro-2(3H)-benzimidazolinone (M.P. 202 to 206°
C.), etc.

EXAMPLE 10

(A) A mixture of ethyl 6-chloro-3-methyl-2-oxo-1-benzimidazolineacetate (0.5 g.) and 2-(N,N-diethyl-amino)-ethylamine (2.5 g.) is heated at 110° C. for 20 hours. The reaction mixture is dissolved in chloroform (100 ml.) and washed with water. The chloroform layer is extracted with 10% hydrochloric acid. The hydrochloric acid layer is washed with chloroform, made alkaline with 10% sodium hydroxide solution and extracted with chloroform. The chloroform extract is washed with water, dried over anhydrous magnesium sulfate and concentrated under reduced pressure. The residue is washed with petroleum benzin and crystallized from a mixture of benzene and petroleum benzin to give N-[2-(N,N-diethylamino)ethyl] - 6-chloro-3-methyl-2-oxo-1-benzimidazolineacetamide (0.2 g.) as white crystals M.P. 124 to 126° C.

(B) A mixture of ethyl 5-chloro-3-methyl-2-oxo-1-benzimidazolineacetate (0.3 g.) and 1-(2-hydroxyethyl)-piperazine (1.0 ml.) is heated at 110° C. for 15 hours. The reaction mixture is combined with ethyl acetate, washed with water and extracted with 10% hydrochloric acid. The hydrochloric acid extract is washed with chloroform and made alkaline with 10% sodium hydroxide solution while cooling with ice. The alkaline solution is extracted with chloroform. The chloroform extract is dried over magnesium sulfate and concentrated under reduced pressure. The residue is crystallized from petroleum benzin and recrystallized from ethyl acetate to give 1-[4-(2-hydroxyethyl) - 1 - piperazinylcarbonylmethyl]-5-chloro-3-methyl-2-oxobenzimidazoline (0.3 g.) as colorless needles. M.P. 173 to 174° C.

Other examples of the compounds which can be prepared in the similar manner include:

1-[4-(2-hydroxyethyl)-1-piperazinylcarbonylmethyl]-
3-methyl-6-chloro-2(3H)-benzimidazolinone (M.P.
172 to 174° C.),
1-[4-(2-hydroxypropyl)-1-piperazinylcarbonylmethyl]-
3-methyl-6-chloro-2(3H)-benzimidazolinone (M.P.
202 to 206° C.), etc.

EXAMPLE A

A suitable formulation of tablets consists of:

| | Grams |
|---|---|
| (1) N-[2-(N,N-diethylamino)ethyl]-2-oxo-3-benzo-thiazolineacetamide | 12.5 |
| (2) Lactose | 80 |
| (3) Starch | 5 |
| (4) Magnesium stearate | 2 |

The active ingredient, lactose and starch are thoroughly mixed and granulated. For tableting, the magnesium stearate is added, mixed with the granules, and the mixture tableted on a rotary press. Use of this procedure produces 100 tablets each containing 125 mg. of the active ingredient.

EXAMPLE B

Another suitable formulation of tablets consists of:

| | Grams |
|---|---|
| (1) N-[2-(N,N-diethylamino)ethyl]-2 - oxo-3-benzo-thiazolineacetamide | 5 |
| (2) Mannitol | 14 |
| (3) Starch | 5 |
| (4) Magnesium stearate | 1 |

The active ingredient, mannitol, starch and magnesium stearate are thoroughly mixed and granulated. For tableting, the magnesium stearate is added, mixed with granules, and the mixture tableted on a rotary press. Use of this procedure produces 100 tablets each containing 50 mg. of the active ingredient.

EXAMPLE C

A suitable formulation of drageés consists of:

(1) 1 - [4 - (2 - hydroxyethyl) - 1 - piperazinylcarbonylmethyl] - 5 - chloro - 2(3H) - benzothiazolinone: 60,000 grams
(2) Aerosil: 4,500 grams
(3) Maize starch: 4,500 grams
(4) Stearic acid: 700 grams
(5) Ethanol: 6.0 liters
(6) Gelatin: 1,800 grams
(7) Purified water: 20.0 liters
(8) Talc: 600 grams
(9) Magnesium stearate: 375 grams From the above materials, there are prepared 600,000 cores each containing 100 mg. of the active ingredient in a conventional manner.

EXAMPLE D

A suitable formulation of suppositories consists of:

| | Grams |
|---|---|
| (1) 1 - [4 - (2 - hydroxyethyl) - 1 - piperazinylcarbonylmethyl] - 5 - chloro - 2(3H) - benzothiazolinone | 25,000 |
| (2) Ethylenediaminetetraacetic acid disodium salt dihydrate | 900 |
| (3) Witepsol H 12 | 124,100 |

From the above materials, there are prepared 100,000 suppositories each containing 250 mg. of the active ingradient in a conventional manner.

What is claimed is:

1. A compound of the formula:

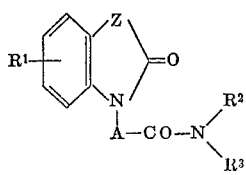

wherein
Z is sulfur or lower alkylimino,
A is lower alkylene,
$R^1$ is hydrogen, halogen, lower alkyl, lower alkoxy or trifluoromethyl,
$R^2$ is hydrogen and
$R^3$ is halo(lower)alkyl, hydroxy(lower)alkyl, lower alkoxy(lower)alkyl, hydroxy(lower)alkoxy(lower)alkyl, hydroxycarbonyl(lower) alkyl, lower alkoxycarbonyl(lower)alkyl, phenyl or phenyl bearing
   one or two substituents selected from the group consisting of lower alkyl, halogen, hydroxy, lower alkoxy and lower alkanoyl,
or the group of the formula:

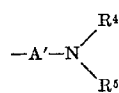

in which
A' is lower alkylene,
$R^4$ is lower alkyl, and
$R^5$ is lower alkyl, phenyl or hydroxyethyl.

2. A compound according to claim 1 in which Z is sulfur, $R^1$ is hydrogen or halogen and $R^3$ is halo(lower)alkyl.

3. A compound according to claim 1 in which Z is sulfur, $R^1$ is halogen and $R^3$ is hydroxy(lower)alkyl.

4. The compound according to claim 3 which is N-(2-hydroxyethyl) - 5 - chloro - 2 - oxo - 3 - benzothiazolineacetamide.

5. The compound according to claim 3 which is N-(2-hydroxyethyl) - 6 - chloro - 2 - oxo - 3 - benzothiazolineacetamide.

6. The compound according to claim 3 which is N-(2-hydroxypropyl) - 5 - chloro - 2 - oxo - 3 - benzothiazolineacetamide.

7. The compound according to claim 3 which is N-(2-hydroxypropyl) - 6 - chloro - 2 - oxo - 3 - benzothiazolineacetamide.

8. The compound according to claim 3 which is N-(2-hydroxypropyl) - 7 - chloro - 2 - oxo - 3 - benzothiazolineacetamide.

9. A compound according to claim 1 in which Z is sulfur, $R^1$ is halogen and $R^3$ is lower alkoxy(lower)alkyl.

10. A compound according to claim 1 in which Z is sulfur, $R^1$ is halogen and $R^3$ is hydroxy(lower)alkoxy(lower)alkyl.

11. The compound according to claim 10 which is N-[2-(2-hydroxyethoxy) - ethyl] - 5 - chloro-2-oxo-3-benzothiazolineacetamide.

12. A compound according to claim 1 in which Z is sulfur, $R_1$ is haloogen and $R_3$ is hydroxycarbonyl (ower)alkyl.

13. A compound according to claim 1 in which Z is sulfur, $R^1$ is halogen and $R^3$ is lower alkoxycarbonyl(lower)alkyl.

14. A compound according to claim 1 in which Z is sulfur, $R^1$ is halogen or trifluoromethyl and $R^3$ is phenyl or phenyl bearing one or two substituents selected from the group consisting of lower alkyl, halogen, hydroxy, lower alkoxy and lower alkanoyl.

15. A compound according to claim 1 in which Z is sulfur or lower alkylimino, $R^1$ is hydrogen, halogen, lower alkyl or lower alkoxy and $R^3$ is N,N-di(lower)alkylamino(lower)alkyl.

16. A compound according to claim 15 in which Z is sulfur, and $R^1$ is hydrogen.

17. The compound according to claim 16 which is N-[2 - (N,N - diethylamino)ethyl]-2-oxo-3-benzothiazolineacetamide.

18. The compound according to claim 16 which is N-[3 - N,N-dimethylamino)propyl] - 2 - oxo-3-benzothiazolineacetamide.

19. A compound according to claim 15 in which Z is sulfur and $R^1$ is halogen.

20. The compound according to claim 19 which is N-[2 - (N,N - diethylamino)ethyl]-5-chloro-2-oxo-3-benzothiazolineacetamide.

21. A compound according to claim 15 in which Z is sulfur and $R^1$ is lower alkyl.

22. The compound according to claim 21 which is N-[2 - (N,N - diethylamino)ethyl]-6-methyl-2-oxo-3-benzothiazolineacetamide.

23. A compound according to claim 15 in which Z is sulfur and $R^1$ is lower alkoxy.

24. The compound according to claim 23 which is N-[2 - (N,N - diethylamino)ethyl]-6-ethoxy-2-oxo-3-benzothiazolineacetamide.

25. A compound according to claim 15 in which Z is lower alkylimino and $R^1$ is halogen.

26. The compound according to claim 25 which is N-[2-(N,N - diethylamino)ethyl] - 3-methyl-6-chloro-2-oxo-1-benzimidazolineacetamide.

27. A compound according to claim 1 in which Z is sulfur, $R^1$ is hydrogen or halogen and $R^3$ is N-lower alkyl-N-phenylamino(lower)alkyl.

28. A compound according to claim 1 in which Z is sulfur, $R^1$ is halogen and $R^3$ is (N-lower alkyl-N-hydroxyethyl)amino(lower)alkyl.

29. The compound according to claim 28 which is N-[2 - [N - methyl-N-(2 - hydroxyethyl)amino]ethyl]-5-chloro-2-oxo-3-benzothiazolineacetamide.

References Cited
UNITED STATES PATENTS 3,069,429  12/1962  Godson et al. _____ 260—304

ALEX MAZEL, Primary Examiner

R. J. GALLAGHER, Assistant Examiner

U.S. Cl. X.R.

260—247.1, 247.2 A, 268 PL, 213.4 E, 294 A, 309.2, 268 C; 424—248, 250, 267, 270, 273